United States Patent
Bradley et al.

(10) Patent No.: US 6,928,196 B1
(45) Date of Patent: Aug. 9, 2005

(54) METHOD FOR KERNEL SELECTION FOR IMAGE INTERPOLATION

(75) Inventors: Andrew Peter Bradley, Castlecrag (AU); Kai Huang, Cecil Hills (AU)

(73) Assignee: Canon Kabushiki Kaisha, Tokyo (JP)

( * ) Notice: Subject to any disclaimer, the term of this patent is extended or adjusted under 35 U.S.C. 154(b) by 805 days.

(21) Appl. No.: 09/688,222

(22) Filed: Oct. 16, 2000

(30) Foreign Application Priority Data

Oct. 29, 1999 (AU) .............................. PQ3778

(51) Int. Cl.$^7$ ................................ G06K 9/32
(52) U.S. Cl. ..................... 382/300; 382/199
(58) Field of Search .................. 382/199, 205, 382/254, 257, 260–262, 264, 266, 269, 275, 279, 300, 308

(56) References Cited

U.S. PATENT DOCUMENTS

| | | | |
|---|---|---|---|
| 5,008,752 A | * 4/1991 | Van Nostrand | 348/581 |
| 5,054,100 A | * 10/1991 | Tai | 382/300 |
| 5,125,042 A | 6/1992 | Kerr et al. | 382/300 |
| 5,131,057 A | 7/1992 | Walowit et al. | 382/264 |
| 5,446,804 A | 8/1995 | Allebach et al. | 382/298 |
| 5,774,601 A | * 6/1998 | Mahmoodi | 382/298 |
| 5,953,465 A | * 9/1999 | Saotome | 382/300 |
| 6,404,918 B1 | * 6/2002 | Hel-or et al. | 382/167 |
| 6,424,749 B1 | * 7/2002 | Zhu et al. | 382/260 |

FOREIGN PATENT DOCUMENTS

AU 199965270 A1 6/2000

OTHER PUBLICATIONS

Reichenbach, et al. "Optimal, small kernels for edge detection", IEEE, pp. 57–63, 1990.*
Freeman, et al. "The design and use of steerable filters", IEEE, pp. 891–906, 1991.*
Farid, et al. "Optimally rotation–equivariant directional derivative kernels*", $7^{th}$ Int'l conf. computer analysis of images and patterns, Kiel, Germany, 1997, pp. 1–8.*
Nishikata, et al. "Filter Circuit: a computer translation of Japanese patent No. 06–260889", pp. 1–35, 1994.*

* cited by examiner

*Primary Examiner*—Daniel Miriam
(74) *Attorney, Agent, or Firm*—Fitzpatrick, Cella, Harper & Scinto

(57) ABSTRACT

A method and apparatus for determining edge information for image data comprising a mapping of discrete sample values are disclosed. An edge strength value is calculated for each of the discrete sample values of the image data to identify edge sample values, and an angle of orientation is stored for each of said edge sample values. The edge sample values and the stored angle of orientation for each of said discrete sample values are manipulated using a morphological process.

40 Claims, 30 Drawing Sheets

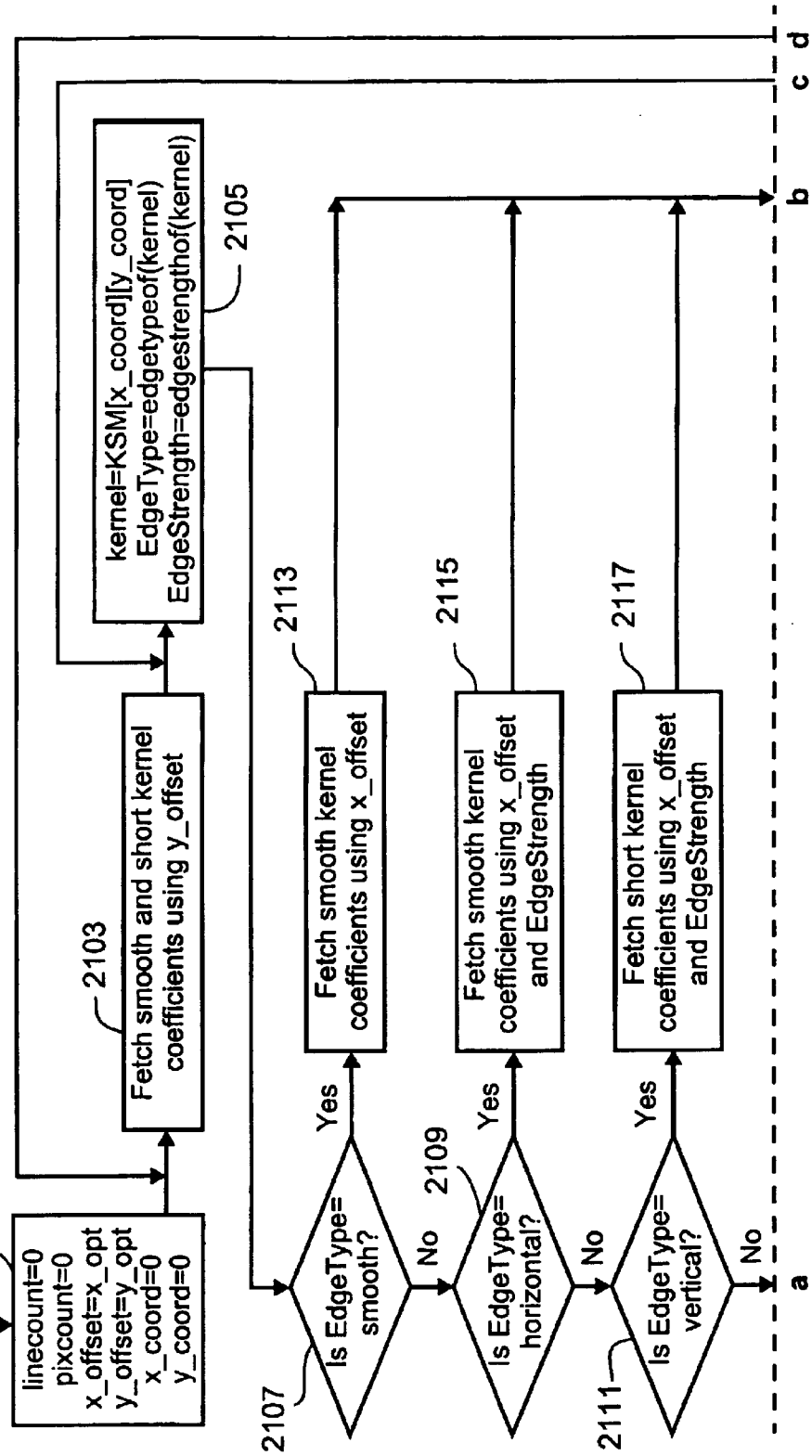

METHOD FOR KERNEL SELECTION FOR IMAGE INTERPOLATION

TECHNICAL FIELD OF THE INVENTION

The present invention relates to a method and apparatus for resolution conversion of multi-dimensional image data and in particular digital image data. The invention also relates to a computer program product including a computer readable medium having recorded thereon a computer program for resolution conversion of multi-dimensional image data and in particular digital image data.

BACKGROUND ART

There are a number of known methods for digital data resolution conversion. For example, transform domain methods such as the fractional Fourier transform (fractional FFT or Chirp-Z transform), the discrete cosine transform (DCT), and discrete wavelet transform (DWT). In addition, there are a number of spatial domain methods such as re-sampling and digital filtering with finite-impulse response (FIR) and infinite-impulse response (IIR) filters and interpolation with continuous, usually cubic, splines. The spline interpolation technique is one interpolation method which can be efficiently implemented using convolution with a continuous kernel. When the continuous kernel produces data that passes through the original data points of an input signal, the kernel is often called an interpolating kernel and when the interpolated data produced is not constrained to pass through the original data points it is often called an approximating kernel.

Prior art continuous kernels for digital data resolution conversion include the nearest neighbour (NN), linear, quadratic, and cubic kernels. The NN kernel is the simplest method, which interpolates the image with the pixel value that is spatially nearest to the required one. The NN kernel works quite well when the scaling ratio is an integer multiple of the original data as it introduces no new values (ie., no new colours), and preserves sharp edges. However, at other ratios the NN kernel has the disadvantage of shifting edge locations which often produces visible distortions in the output image, especially in images containing text or fine line details. Linear interpolation on the other hand allows for the introduction of new grey levels (or colours) that are effectively used to position edges at sub-pixel locations. However, the Linear interpolation method has the disadvantage of making sharp edges which can appear to be blurred. Quadratic and cubic interpolation provide steeper step responses and therefore less edge blurring, however, the steeper response results in an overshoot on either side of the edge. These overshoots can make the edges in natural images appear sharper, but on text, fine lines, or other computer generated graphics these overshoots are clearly visible and detract from the perceived image quality and text legibility.

In view of the foregoing discussion, it can be concluded that each kernel has its own strengths and weaknesses, ie., there are certain image areas which are best interpolated using kernels of different shapes. Simply applying a single continuous convolution kernel at every image pixel will not satisfy all of the requirements for a general-purpose resolution conversion application.

The publication U.S. Pat. No. 5,131,057 discloses a kernel with both a steep step response, but no overshoot whereby the parameters of the cubic kernel are adjusted according to image information. U.S. Pat. No. 5,131,057 discloses a two-parameter Catmull-Rom cubic kernel of the form:

$$h(s) = \begin{cases} \left(2 - \frac{3}{2}b - c\right)|s|^3 + (-3 + 2b + c)|s|^2 + \left(1 - \frac{1}{3}b\right), & |s| \leq 1 \\ \left(-\frac{1}{6}b - c\right)|s|^3 + (b + 5c)|s|^2 + (-2b - 8c)|s| + \left(\frac{4}{3}b + 4c\right), & 1 < |s| \leq 2 \\ 0, & \text{Otherwise} \end{cases} \quad (1)$$

Choosing parameters b and c (b=0, c=0.5), results in an interpolating cubic that agrees with the first three terms of the Taylor series expansion of the original image, and choosing (b=1, c=0) results in the approximating cubic B-spline. In U.S. Pat. No. 5,131,057 the parameter b is fixed at b=0, whilst c is varied between 0, 0.5, and 1 dependent upon the edge strength measured using a Laplacian of Gaussian (LOG) edge detector. At a sharp edge c=0 the resulting cubic is:

$$h(s) = \begin{cases} 2|s|^3 - 3|s|^2 + 1, & |s| \leq 1 \\ 0, & \text{Otherwise.} \end{cases} \quad (2)$$

There is however, a problem with using the kernel disclosed in U.S. Pat. No. 5,131,057 to interpolate image data when the re-sampled pixel displacement is not significantly different from the original pixel displacement, say a re-sampling ratio of 10/11 or 11/10. In that instance, pixels at the edges of text and other fine lines take on a grey value rather than the original black or white values resulting in the blurring of sharp edges and a reduction in the observed image quality.

A further problem with conventional continuous convolution kernels is associated with their application to edges at oblique orientations in an image plane. Conventional kernels can be either applied in a separable fashion, ie., first to the rows of the image and then to the columns, or applied in a 2-dimensional form where the kernels are directly convolved with the 2-dimensional image data. However, the kernel orientations in these implementations are limited to either horizontal, vertical, or symmetrical. Upon encountering an oblique edge, the pixels on either side of an edge are primarily used in the interpolation rather than pixels along the edge resulting in an interpolated edge that no longer appears to be clean and smooth, but appears to be jagged, or blurred, or both. The publication U.S. Pat. No. 5,446,804, discloses a method which prevents interpolation across edges by using extrapolated estimates of pixel values for pixels on the other side of the edge in the bilinear interpolation. However, the method disclosed by U.S. Pat. No. 5,446,804 requires highly accurate sub-pixel edge estimation at the output resolution and iterative post-processing using a successive approximation procedure, which place high demands on memory and processing resources.

The publication U.S. Pat. No. 5,125,042 discloses a method for selecting interpolation kernels based on edge strength, or user input. However, there are some defects that prevent the method disclosed by U.S. Pat. No. 5,125,042 from working optimally. Firstly, the use of edge strength alone as the basis for kernel selection does not provide sufficient information for reliable kernel selection (especially at oblique edges). Secondly, Kernel selection based solely upon user input is impractical and does not specify the kernel selection in enough detail. For example, in the sub-image shown in FIG. 7 of U.S. Pat. No. 5,125,042, there is not one single kernel that is ideal for the whole sub-image. In general, different kernels are required at a resolution that is impractical to be specified by a user.

Kernel selection needs to be both automatic and reliable so that the appropriate kernel can be used on different edge strengths and edge directions that are typically found in images.

DISCLOSURE OF THE INVENTION

It is an object of the present invention to substantially overcome, or at least ameliorate, one or more disadvantages of existing arrangements.

According to one aspect of the present invention there is provided a method of determining edge information for image data comprising a mapping of discrete sample values said method comprising the steps of:

(i) calculating an edge strength value for each of said discrete sample values of said image data to identify edge sample values;

(ii) storing an angle of orientation for each of said edge sample values; and (iii) manipulating said edge sample values and said stored angle of orientation for each of said discrete sample values using a morphological process.

According to another aspect of the present invention there is provided a method of interpolating image data comprising a first mapping of discrete sample values, said method comprising the steps of:

(i) calculating edge information for each of said discrete sample values of said image data to identify edge sample values and storing an angle of orientation and an edge strength value for each of said edge sample values;

(ii) manipulating said edge sample values and said stored angle of orientation for each of said discrete sample values using a morphological process;

(iii) combining said manipulated edge sample values and said manipulated angle of orientation for each of said discrete sample values to form a second mapping of said discrete sample values;

(iv) mapping said manipulated edge sample values of said second mapping, using a mapping function, to form a third mapping;

(v) for each discrete sample value of said third mapping:

(i) calculating parameters of a kernel, wherein said parameters are dependant upon said edge sample values and said angle of orientation of each of said sample values of said third mapping;

(ii) calculating a plurality of kernel values utilising said parameters and said kernel; and (vi) convolving said plurality of kernel values with said first mapping of discrete sample values to form a fourth mapping of discrete sample values.

According to still another aspect of the present invention there is provided a method of performing interpolation on a pixel-based image, said method comprising the steps of:

accessing a first set of discrete sample values of said image data;

calculating kernel values for each of said discrete sample values using a kernel, wherein parameters of said kernel are selected depending upon an edge orientation indicator, an edge strength indicator, and an edge context indicator for each of said discrete sample values; and convolving said kernel values with said discrete sample values to provide a second set of discrete sample values.

According to still another aspect of the present invention there is provided a method of interpolating a first set of discrete sample values to generate a second set of discrete sample values using an interpolation kernel, wherein parameters of said interpolation kernel are selected depending on an edge strength indicator, an edge direction indicator and an edge context indicator for each discrete sample value of said first set.

According to still another aspect of the present invention there is provided an apparatus for determining edge information for image data comprising a mapping of discrete sample values, said apparatus comprising:

calculation means for calculating an edge strength value for each of said discrete sample values of said image data to identify edge sample values;

storage means for storing an angle of orientation for each of said edge sample values; and manipulation means for manipulating said edge sample values and said stored angle of orientation for each of said discrete sample values using a morphological process.

According to still another aspect of the present invention there is provided an apparatus for interpolating image data comprising a first mapping of discrete sample values, said apparatus comprising:

first calculation means for calculating edge information for each of said discrete sample values of said image data to identify edge sample values and storing an angle of orientation and an edge strength value for each of said edge sample values;

manipulation means for manipulating said edge sample values and said stored angle of orientation for each of said discrete sample values using a morphological process;

combination means for combining said manipulated edge sample values and said manipulated angle of orientation for each of said discrete sample values to form a second mapping of said discrete sample values;

mapping means for mapping said manipulated edge sample values of said second mapping, using a mapping function, to form a third mapping;

second calculation means for calculating parameters of a kernel for each discrete sample value of said third mapping, wherein said parameters are dependant upon said edge sample values and said angle of orientation of each of said sample values of said third mapping, and for calculating a plurality of kernel values utilising said parameters and said kernel; and convolution means for convolving said plurality of kernel values with said first mapping of discrete sample values to form a fourth mapping of discrete sample values.

According to still another aspect of the present invention there is provided an apparatus for performing interpolation on a pixel-based image, said apparatus comprising:

accessing means for accessing a first set of discrete sample values of said image data;

calculation means for calculating kernel values for each of said discrete sample values using a kernel, wherein parameters of said kernel are selected depending upon an edge orientation indicator, an edge strength indicator, and an edge context indicator for each of said discrete sample values; and convolution means for convolving said kernel values with said discrete sample values to provide a second set of discrete sample values.

According to still another aspect of the present invention there is provided an apparatus for interpolating a first set of discrete sample values to generate a second set of discrete sample values using an interpolation kernel, wherein parameters of said interpolation kernel are selected depending on an edge strength indicator, an edge direction indicator and an edge context indicator for each discrete sample value of said first set.

According to still another aspect of the present invention there is provided a computer readable medium, having a program recorded thereon, where the program is configured to make a computer execute a procedure to determine edge information for image data comprising a mapping of discrete sample values, said program comprising:

code for calculating an edge strength value for each of said discrete sample values of said image data to identify edge sample values;

code for storing an angle of orientation for each of said edge sample values; and code for manipulating said edge sample values and said stored angle of orientation for each of said discrete sample values using a morphological process.

According to still another aspect of the present invention there is provided a computer readable medium, having a program recorded thereon, where the program is configured to make a computer execute a procedure to interpolate image data comprising a first mapping of discrete sample values, said program comprising:

code for calculating edge information for each of said discrete sample values of said image data to identify edge sample values and storing an angle of orientation and an edge strength value for each of said edge sample values;

code for manipulating said edge sample values and said stored angle of orientation for each of said discrete sample values using a morphological process;

code for combining said manipulated edge sample values and said manipulated angle of orientation for each of said discrete sample values to form a second mapping of said discrete sample values;

code for mapping said manipulated edge sample values of said second mapping, using a mapping function, to form a third mapping, wherein for each discrete sample value of said third mapping, said program comprises code for calculating parameters of a kernel, wherein said parameters are dependant upon said edge sample values and said angle of orientation of each of said sample values of said third mapping, and for calculating a plurality of kernel values utilising said parameters and said kernel; and code for convolving said plurality of kernel values with said first mapping of discrete sample values to form a fourth mapping of discrete sample values.

BRIEF DESCRIPTION OF THE DRAWINGS

Embodiments of the present invention will now be described with reference to the drawings, in which.

DETAILED DESCRIPTION INCLUDING BEST MODE

Figure 1:
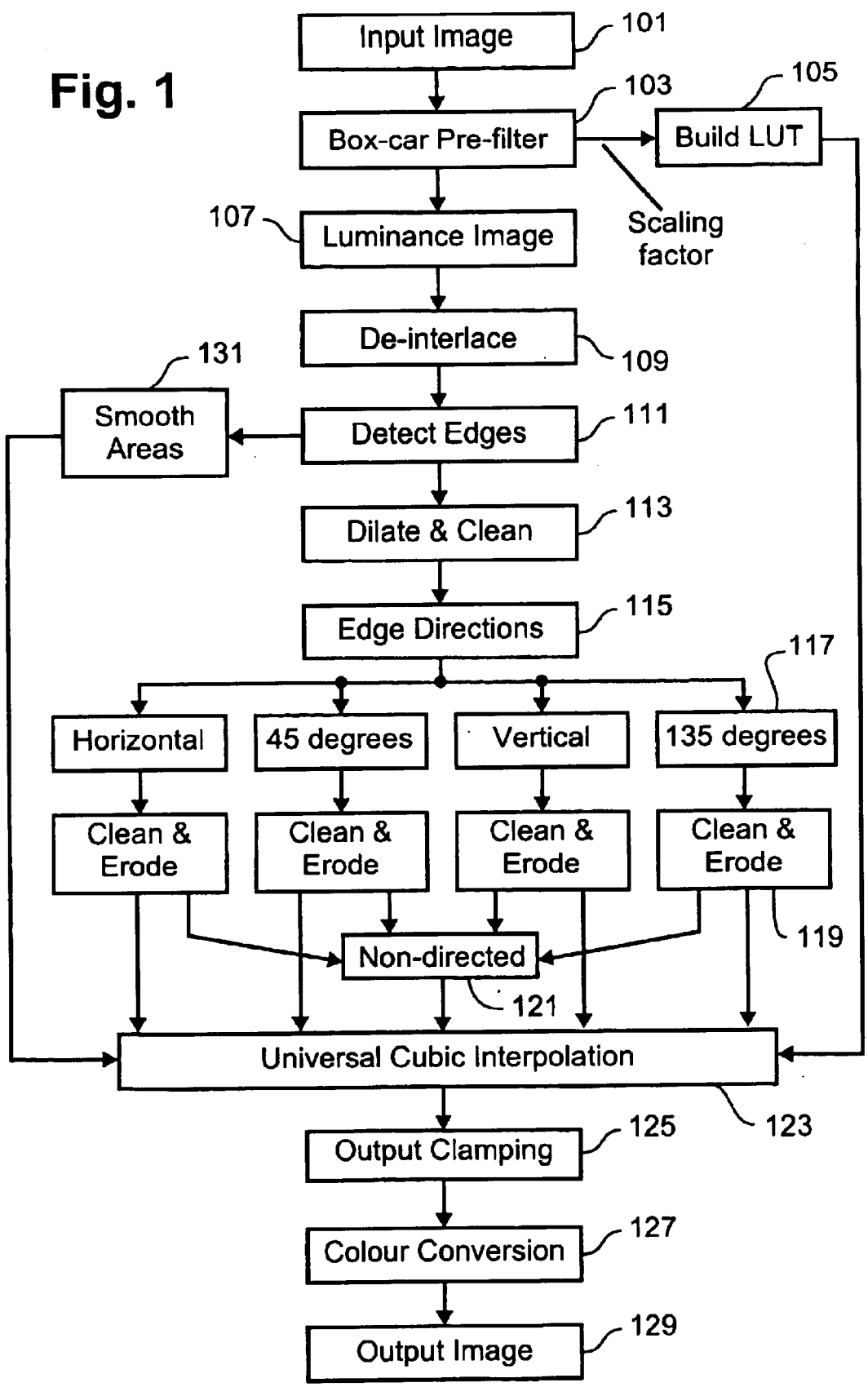
FIG. 1 is a flowchart showing a method of image interpolation in accordance with the preferred embodiment of the present invention.

Where reference is made in any one or more of the accompanying drawings to steps and/or features, which have the same reference numerals, those steps and/or features have for the purposes of this description the same function(s) or operation(s), unless the contrary intention appears.

When re-sampling a digital image, smooth regions and edge regions need to be re-sampled differently. A long symmetrical kernel, such as the conventional Catmull-Rom cubic with c=0.5, is ideal for smooth image regions. A short kernel, such as the Catmull-Rom cubic with c=0, is generally good for edge, corner, or highly textured regions. However, in order to reduce the jaggy effect on oblique edges, edge direction also needs to be taken into account in the interpolation process. Edge direction is important so that the interpolation can smooth along an edge, but not across an edge, keeping the edge contour smooth, whilst the edge transition is kept sharp.

The preferred embodiment is a method of image interpolation that produces images with edge contours that have a perceived improvement in smoothness and sharpness. The preferred method automatically selects the appropriate interpolation kernel for each image region using edge strength, edge direction, and local edge context information. The preferred method of image interpolation is based on the idea of creating a number of binary images that identify the locations of homogeneous image features. The image regions identified in accordance with the preferred embodiment are: smooth areas with no sharp edge features, and edge areas that are either supported by their local neighbourhood to produce approximately linear edges or edges that are not supported by their local neighbourhood and are isolated or complex (corners or intersecting) edges. The different regions can then be interpolated differently by varying the parameters of a single convolution kernel, hereinafter called the universal cubic convolution kernel.

FIG. 1 is a flowchart showing the method of image interpolation in accordance with the preferred embodiment of the present invention. The overall method will be described first and then each sub-block of FIG. 1 will be described in more detail. The process begins with a number of pre-processing and initialisation steps, ie., steps 101, 103, 107 and 109. At step 101, the input image is read together with a requested scaling factor. If the image is being down-sampled the image is initially (box-car) pre-filtered, at step 103, as required, and the requested scaling factor reduced appropriately. At the next step 105, the (potentially new) scaling factor is used to build a kernel look-up-table (LUT) of the required interpolation coefficients. The process continues at step 107, where a luminance image is constructed. At the next step 109, the input image can be de-interlaced if it is found that the input image is interlaced. The process continues at step 111, where a non-linear edge detector is applied to the luminance image and an edge map is created. At step 131, smooth areas are detected and directly interpolated using a convolution kernel in accordance with the preferred embodiment. At the next step 113, the edge map is dilated and cleaned using a morphological process. The process continues at step 115, where the directions of the detected edges are determined. At the next step 117, the detected edges are quantised into four directional binary image maps. The process continues at the next step 119, where the edge direction maps are cleaned and directionally eroded in turn. At the next step 121, an additional map of non-directed edges is created. The process continues at step 123, where the locations of edges, their directions, and local support are all used to generate a kernel selection map and the kernel selection map is used to vary the parameters of a universal cubic kernel. Thus, an appropriate interpolation can be carried out at each image location. The interpolation is preferably carried out with local limiting, at step 125, so as to ensure that there are no ringing artefacts introduced. The process continues at step 127, where any required colour space conversion is undertaken. The process concludes at step 129, where an output image of the correct size and format is produced.

When down-sampling image data at a scaling factor less than ¼ pre-filtering in addition to the cubic convolution is applied to the image data. The pre-filtering is necessary since the cubic convolution kernel is of a fixed size, preferably 4 by 4 coefficients, and therefore only filters 4 pixels along both the rows and the columns of an input image when creating an output pixel. The result is that when down-sampling at a scaling factor less that ¼, some lines or columns in the input image are not used at all to calculate output pixels. Therefore, these lines or columns are effectively dropped, as they have no effect on the output. In order to ensure that all input pixels have an effect on the output image, it is necessary to pre-filter and then down-sample the input image. The pre-filtering and down-sampling process ensures that the cubic convolution kernels alone are never used to down-sample a scaling factor of less than ¼.

Figure 2:
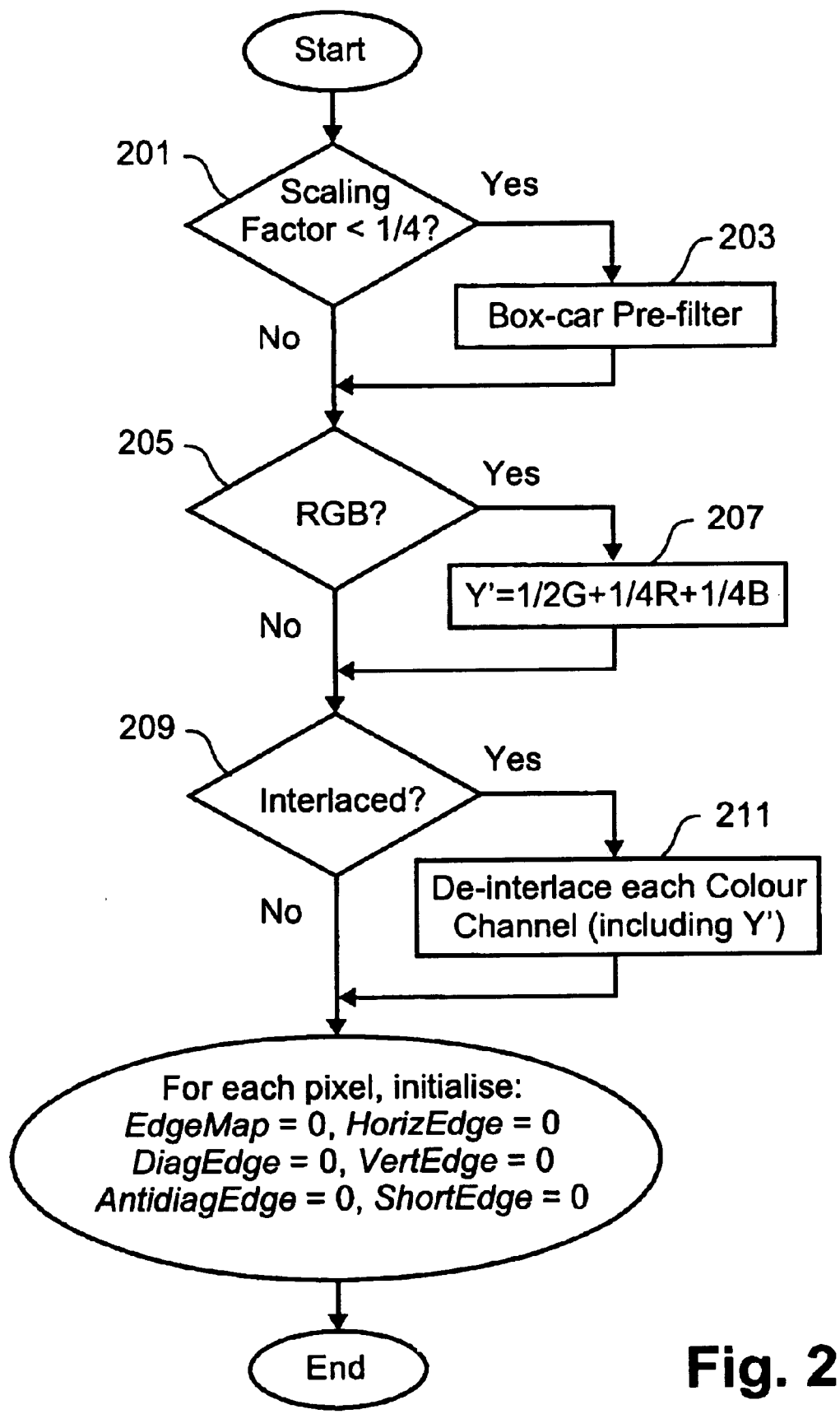
FIG. 2 a flowchart showing the pre-processing and initialisation steps in accordance with the method of FIG. 1.

FIG. 2 is a flowchart showing the pre-processing and initialisation steps in accordance with the preferred embodiment of the present invention. The process begins with a decision block at step 201 to check the down scaling ratio. When down-sampling at scaling factors less than ¼ the output image is significantly smaller than the input image and so it is not necessary to use a complex pre-filter, at step 203. The preferred method preferably uses a boxcar (ie., rectangular), pre-filter that simply averages pixels over the size of the rectangular input window. Table 1 illustrates the size of the preferred box-car pre-filter over the range of scaling factors handled by the preferred embodiment. The size along the rows or the columns can preferably be specified separately.

TABLE 1

| Scaling Factor (SF) | Box-car pre-filter Size | Down-sample rate |
|---|---|---|
| 20 > SF ≧ ¼ | None | None |
| ¼ > SF ≧ ⅛ | 2 | ½ |
| ⅛ > SF ≧ 1/12 | 3 | ⅓ |
| 1/12 > SF ≧ 1/16 | 4 | ¼ |
| 1/16 > SF ≧ 1/20 | 5 | ⅕ |

The process continues at step 205, where a check is carried out to determine if the input image is a YUV image. In the case of a YUV image the Y channel is used directly, while for an RGB image the pseudo luminance channel (Y') is created, at step 207, preferably using a rational approximation to the luminance defined in YUV. The process continues at step 209, where a check is carried out to determine whether the input image is interlaced. If the input image is interlaced, each colour channel (including Y') is de-interlaced, at step 211. The kernel selection map created from the luminance image is used to interpolate all three input channels regardless of whether they are in RGB or YUV format. The use of the kernel selection map on the chrominance channels may seem unnecessary, as the human visual system is less sensitive to spatial changes in chrominance than in luminance and therefore the conventional cubic interpolation would seem to be sufficient. However, for implementation simplicity and to guarantee the generation of no false colours particularly on computer graphics and text images, exactly the same interpolation kernels are used on all the input (RGB or YUV) channels.

Edge Detection

Figure 3:
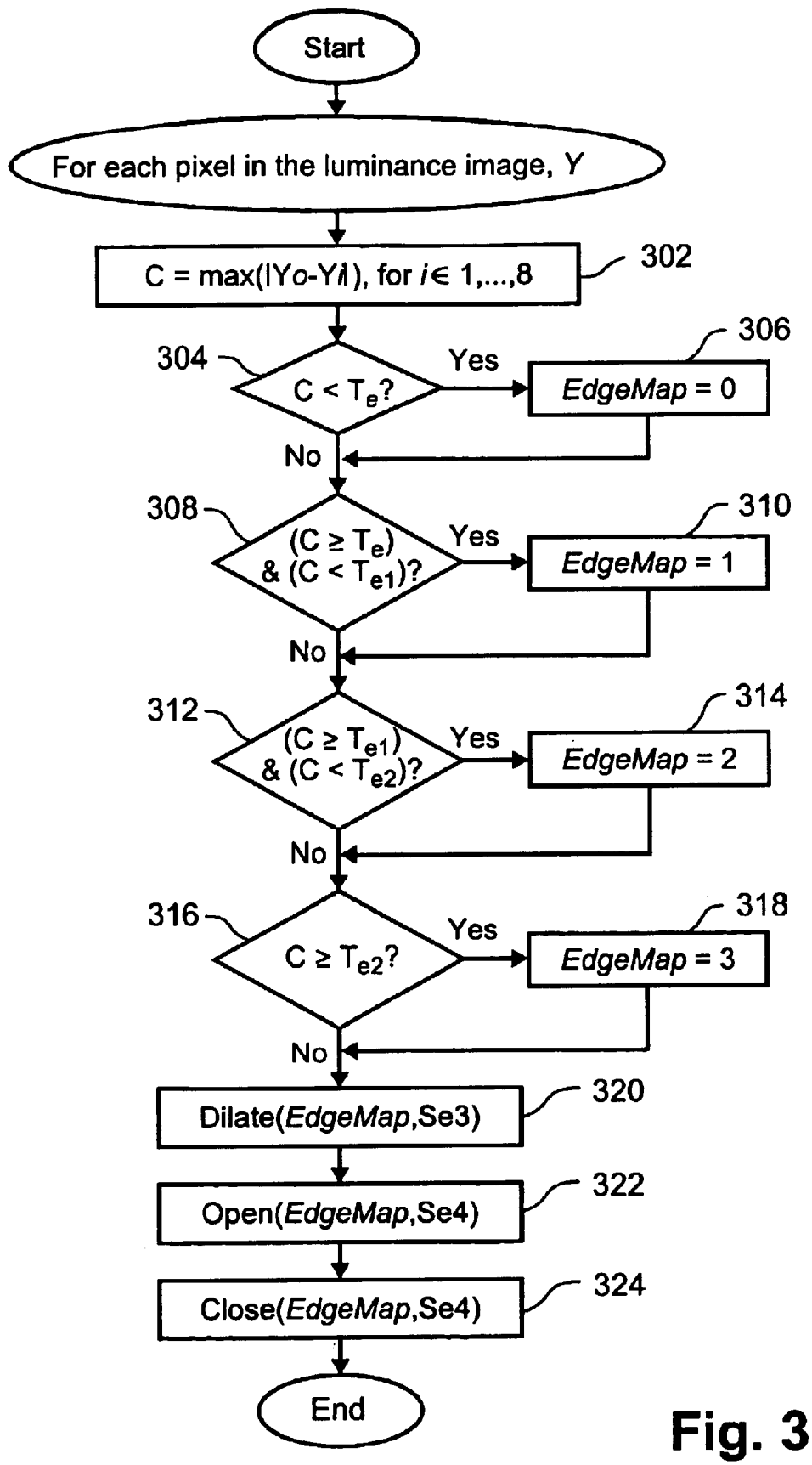
FIG. 3 is a flowchart showing the allocation of edge strengths to an edge map in accordance with the method of FIG. 1.

FIG. 3 is a flowchart showing the allocation of edge strengths to the EdgeMap, edge map cleaning and dilation (steps 111 and 113 of FIG. 1), in accordance with the preferred embodiment of the present invention. Edges in the luminance image are detected using a simple pixel difference operator over a 3 by 3 pixel neighbourhood, as shown below:

$Y_6$ $Y_7$ $Y_8$ $Y_5$ $Y_0$ $Y_1$ $Y_4$ $Y_3$ $Y_2$

The process begins at step 302, where, for each centre pixel, $Y_0$, the value C is calculated and compared with a threshold $T_e$ as follows:

$$C = \max(|Y_0 - Y_i|), i \in 1, \ldots, 8 \quad (1)$$

where i is the index of the eight nearest neighbour pixels of the centre pixel, $Y_0$. At the next step 304, a check is carried out to determine if the value of C is greater than or equal to the threshold, $T_e$. If the value of C is greater than the threshold, $T_e$, the pixel $Y_0$ is labelled as an edge pixel. The process continues at steps 306 to 318, where the allocation of edge strengths to the EdgeMap is carried out. The allocation of edge strengths to the EdgeMap is preferably as follows:

$$EdgeMap = \begin{cases} 1 & T_{e1} > C \geq T_e \\ 2 & T_{e2} > C \geq T_{e1} \\ 3 & C \geq T_{e2} \\ 0 & \text{otherwise} \end{cases} \quad (2)$$

The process shown in FIG. 3 acts as a non-linear edge detection filter, which reliably detects all of the edges in an image. The filter has been found to be superior to both odd length linear filters, which have a zero response to single pixel wide edges, and even length filters, which effectively measure edge strength mid-way between the original pixels. The preferred threshold values in accordance with the present invention are $T_e=64$, $T_{e1}=128$, and $T_{e2}=192$. The filter detects pixel differences that are perceived as edges in the image, whilst also detecting more smoothly varying intensity gradients. For the following edge map cleaning process described below any non-zero entry in the EdgeMap is effectively treated as an edge during the morphological operations.

Edge Detection Cleaning

When interpolating an edge region a short interpolation kernel will often be used (eg., 2 by 2), whilst on a non-edge (smooth) region a longer interpolation kernel will be used (eg., 4 by 4). To ensure that the long kernel used in the smooth regions is not contaminated by edge pixels it is necessary to mark the two pixels adjacent to an edge as edge pixels. The preferred embodiment of the present invention uses a morphological dilation, at step 320, with a 3 by 3 structuring element as follows:

$$Se\_3 = \begin{bmatrix} 1 & 1 & 1 \\ 1 & 1 & 1 \\ 1 & 1 & 1 \end{bmatrix}$$

In addition, to remove small isolated edges, that can be due to noise in the image, and to fill in any areas that adjoin two adjacent edge areas, a morphological opening (an erosion followed by a dilation) followed by a closing (a dilation followed by an opening) is carried out on the image, at steps 322 and 324, respectively. The opening and closing is preferably carried out with a 4 by 4 structuring element as follows:

$$Se\_4 = \begin{bmatrix} 1 & 1 & 1 & 1 \\ 1 & 1 & 1 & 1 \\ 1 & 1 & 1 & 1 \\ 1 & 1 & 1 & 1 \end{bmatrix}$$

Edge Direction Detection

Figure 4:
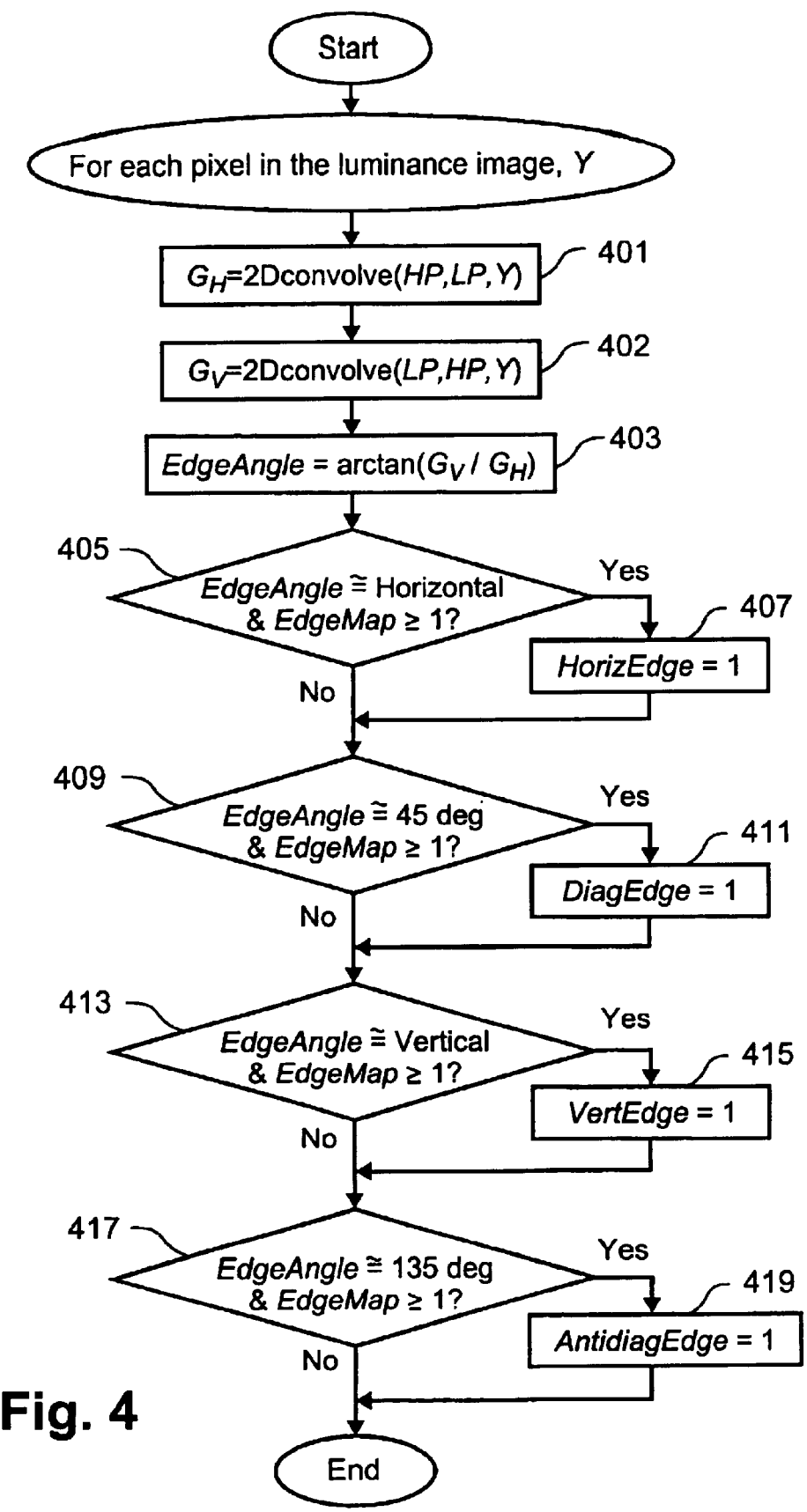
FIG. 4 is a flowchart showing the application of edge direction filters and subsequent edge angle quantisation in accordance with the method of FIG. 1.

The directions associated with the edges detected in the EdgeMap are determined at step 115 of FIG. 1. FIG. 4 shows step 115 in more detail with the application of edge direction filters and subsequent edge angle quantisation. The directions are detected using two 1 dimensional filters applied separably to measure edge responses in both the horizontal and vertical directions, at steps 401 and 402, respectively. The filters preferably consist of a low-pass interpolating filter and a high-pass first derivative filter. When the high-pass filter is applied along the rows of an image and the low-pass down the columns, the edge strength in the horizontal direction is calculated and is referred to as $G_h$. When the low-pass filter is applied along the rows and the high-pass down the columns, the edge strength in the vertical direction is calculated and is referred to as $G_v$. In a further embodiment the filters used to detect the edges are 3-tap optimal edge detectors. In still a further embodiment the edge detection filters are rational approximations to the above optimal filters with only a minimal reduction in performance. The coefficients used in the first embodiment for forming $G_h$ and $G_v$ are shown in Table 2. It should be noted that the rational approximation filters are equivalent to the Sobel operators commonly used for edge detection.

TABLE 2

| Optimal Coefficients | | | |
|---|---|---|---|
| Low-pass (LP) | 0.223755 | 0.552490 | 0.223755 |
| High-pass (HP) | −0.453014 | 0 | 0.453014 |
| Rational Approximation Coefficients | | | |
| Low-pass (LP) | ¼ | ½ | ¼ |
| High-pass (RP) | −½ | 0 | ½ |

At the next step 403, the edge direction, $G_\theta$, is calculated from the edge strengths in the vertical and horizontal directions using:

$$G_\theta = \tan^{-1} G_v / G_h \quad (3)$$

The process continues at steps 405 to 419, where the edge direction, $G_\theta$, is quantised into one of the four directions: horizontal (0), diagonal ($\pi/4$), vertical ($\pi/2$), and anti-diagonal ($3\pi/4$). The preferred edge angle quantisation in accordance with the preferred embodiment is shown in Table 2. In a further embodiment the inverse tangent and angle quantisation is replaced with a single table look up operation indexed on $G_h$ and $G_v$.

TABLE 2

| Directional Channel | Edge Angle Quantisation |
|---|---|
| HorizEdge (0) | $((G_\theta \geq -\pi/20) \& (G_\theta \leq \pi/20))$ \| $((G_\theta > 1919\pi/20) \| (G_\theta < -1919\pi/20))$ |
| DiagEdge ($\pi/4$) | $((G_\theta > \pi/20) \& (G_\theta \leq 99\pi/20))$ \| $((G_\theta < -1111\pi/20) \& (G_\theta \geq -1919\pi/20))$ |
| VertEdge ($\pi/2$) | $((G_\theta > 99\pi/20) \& (G_\theta \leq 1111\pi/20))$ \| $((G_\theta < -99\pi/20) \& (G_\theta \geq -1111\pi/20))$ |
| AntidiagEdge ($33\pi/4$) | $((G_\theta > 1111\pi/20) \& (G_\theta \leq 1919\pi/20))$ \| $((G_\theta < -\pi/20) \& (G_\theta \geq -99\pi/20))$ |

Edge Direction Cleaning

Figure 5:
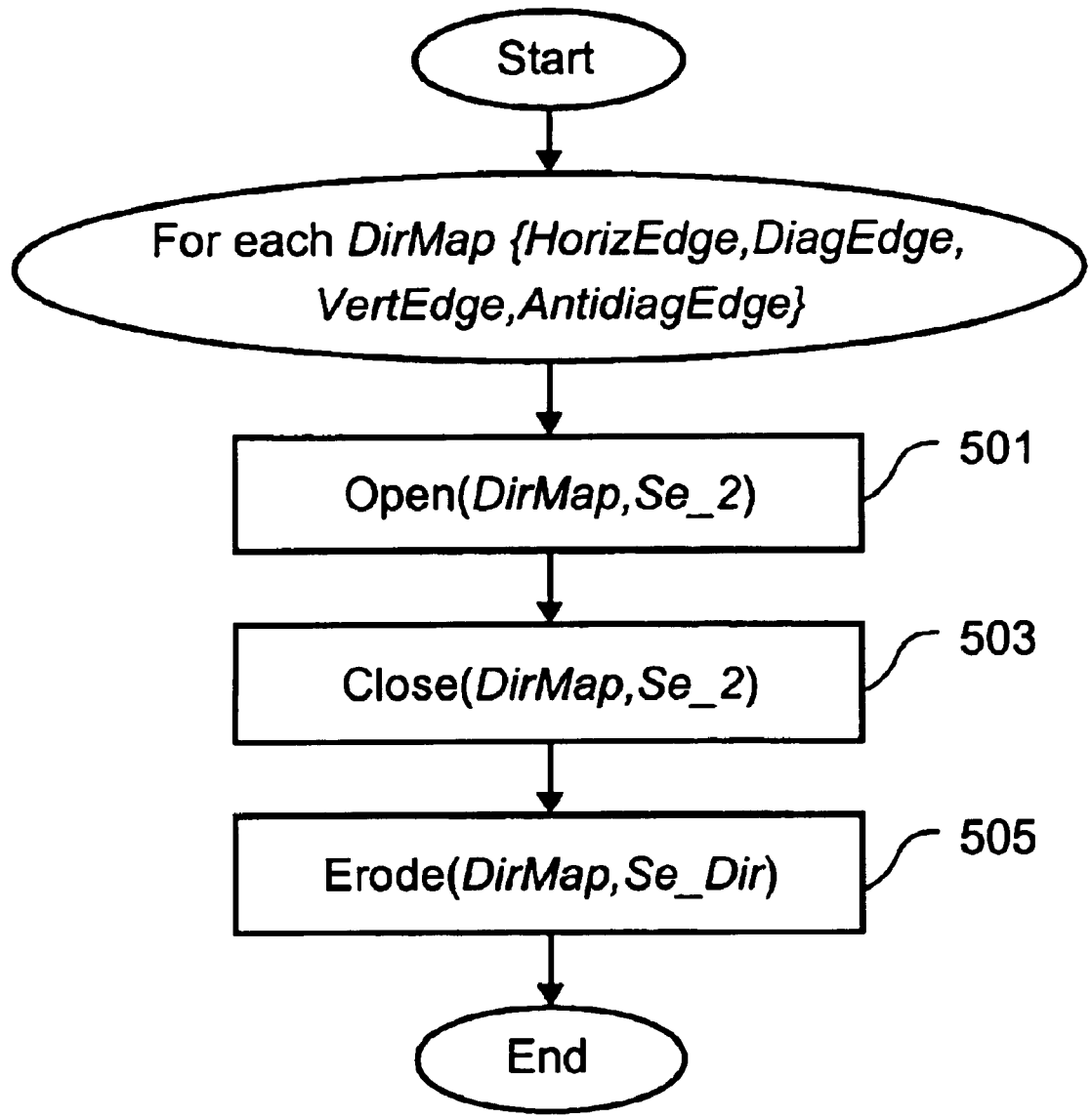
FIG. 5 is a flowchart showing the process of edge direction map cleaning in accordance with the method of FIG. 1.

FIG. 5 shows the process of edge direction map cleaning in accordance with the preferred embodiment. After the four binary maps corresponding to each of the four edge directions have been created they require cleaning to remove small regions and connect adjoining regions. The cleaning is carried out using binary morphological operations: a morphological opening followed by a closing, at steps 501 and 503, respectively. In accordance with the preferred embodiment both operations are carried out with a (2 by 2) structuring element as follows:

$$Se\_2 = \begin{bmatrix} 1 & 1 \\ 1 & 1 \end{bmatrix}.$$

At the next step 505, a morphological erosion operation is carried out. The erosion operation is carried out in order to reduce any edge fading or overshoots and to ensure that directional interpolation is only carried out on edge pixels that are adjacent to other edge pixels of the same direction. The morphological erosion operation marks the centre pixel as non-zero only when all non-zero elements in the structuring element align with non-zero elements in the image. In the case of the horizontal edge map image, the following structuring element is preferably used:

$$Se\_Horizontal = \begin{bmatrix} 0 & 0 & 0 \\ 1 & 1 & 1 \\ 0 & 0 & 0 \end{bmatrix}.$$

Using the above structuring element, there will be a non-zero output in the horizontal edge map only when a horizontal edge pixel has a horizontal edge pixel both to the left and the right of itself. The erosion operation is applied to all the remaining edge direction maps with their appropriate, directional, structuring element. For diagonal ($\pi/4$) edges the following structuring element is preferably used:

$$Se\_Diagonal = \begin{bmatrix} 0 & 0 & 1 \\ 0 & 1 & 0 \\ 1 & 0 & 0 \end{bmatrix}.$$

For vertical ($\pi/2$) edges the following structuring element is preferably used:

$$Se\_Vertical = \begin{bmatrix} 0 & 1 & 0 \\ 0 & 1 & 0 \\ 0 & 1 & 0 \end{bmatrix}.$$

Finally, for anti-diagonal ($3\pi/4$) edges the following structuring element is preferably used:

$$Se\_Antidiag = \begin{bmatrix} 1 & 0 & 0 \\ 0 & 1 & 0 \\ 0 & 0 & 1 \end{bmatrix}.$$

Non-directed Edges

Figure 6:
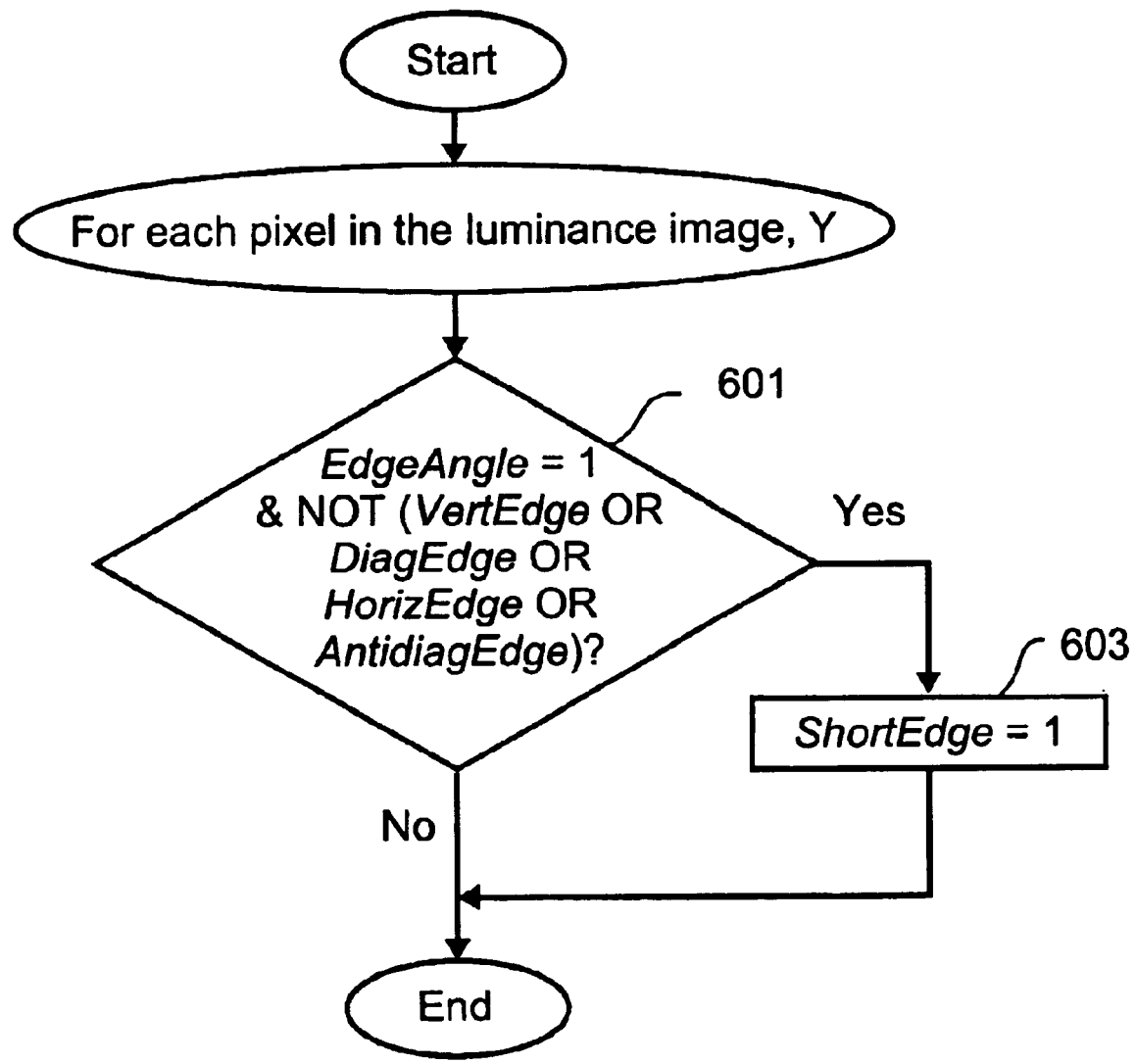
FIG. 6 is a flowchart showing the process of determining how the non-directed edges in accordance the method of FIG. 1.

FIG. 6 shows how non-directed edges are determined in accordance with the preferred embodiment. The above erosion operation with each of the directional structuring elements effectively removes pixels from the edge direction maps where edge pixels are not supported by their neighbours, eg., at a boundary between two edge directions, in corners, or on edges of length less than 3 pixels. The result is pixels that are marked as edges, but are not associated with an edge direction. At step 603, the pixels not associated with an edge direction, determined at step 601, are marked as short edge pixels using the following logical operation:

ShortEdge=(EdgeMap &
(HorizEdge|DiagEdge|VertEdge|AntidiagEdge)).

Kernel Selection Map Generation

Figure 7:
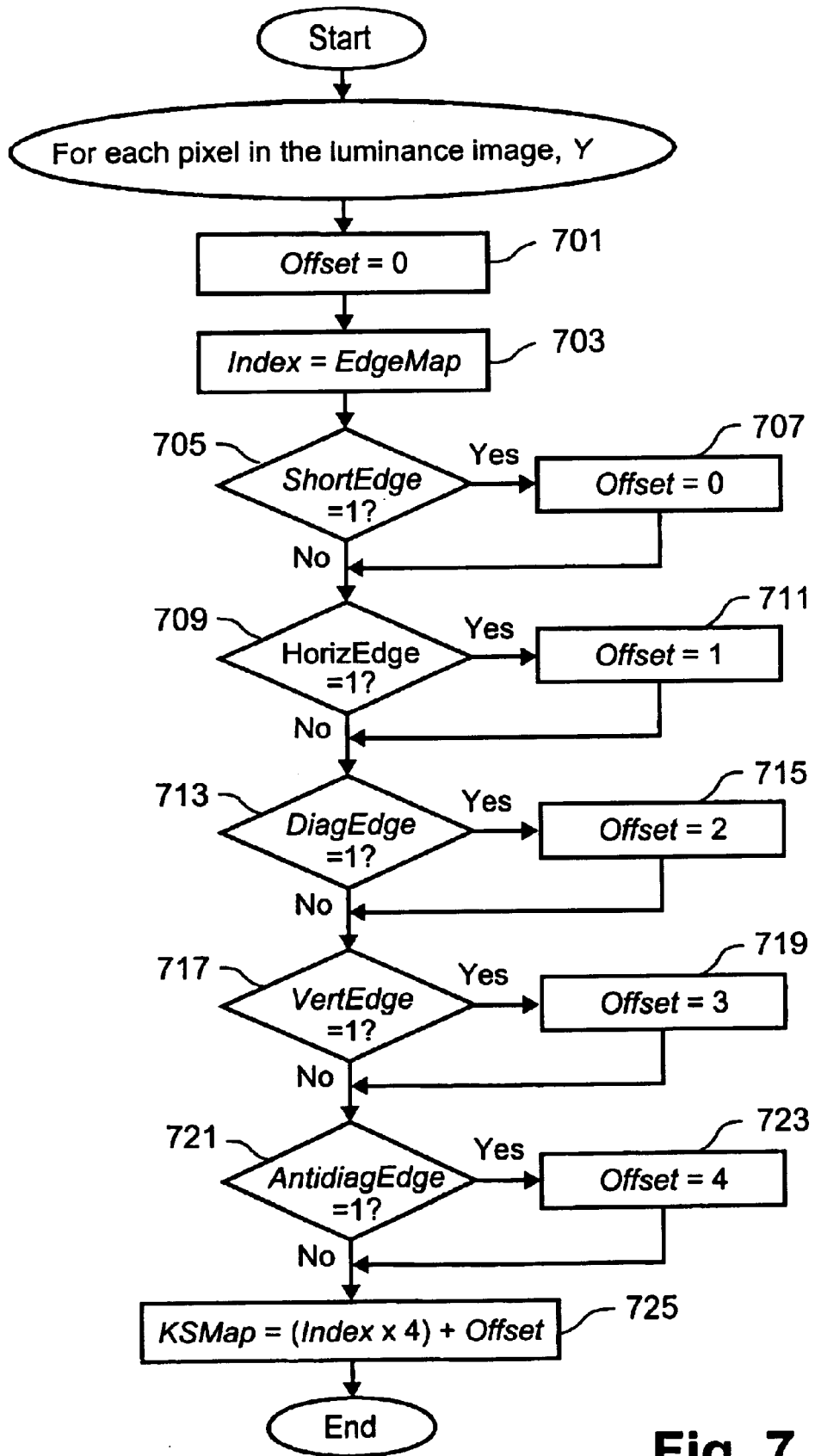
FIG. 7 is a flowchart showing the creation of a LUT index that forms a kernel selection map in accordance with the method of FIG. 1.

FIG. 7 shows the creation of a LUT index that forms a kernel selection map, in accordance with the preferred embodiment of the present invention. There are five binary edge maps (HorizEdge, DiagEdge, VertEdge, AntidiagEdge, and ShortEdge) that indicate the locations of directed and non-directed (ie., short) edges, respectively, for each pixel in the luminance image. Together with the edge strength information (EdgeMap) the five binary edge maps form the kernel selection map, which is used to interpolate the input image. The process for each pixel in the luminance image Y begins at step 701, where an Offset is initialised. At the next step 703, an index pointer is initialised to the edge strength information for a pixel in the luminance image. The process continues at steps 705 to 723, where the binary edge maps for the respective pixel are associated with an offset value depending on what value the respective binary edge map is set to. At the next step 725, the kernel selection map value for the respective pixel is calculated according to the following formula:

$$KSMap=(Index \times 4)+Offset. \tag{1}$$

The kernel selection map effectively defines the appropriate set of parameters to apply to the universal cubic kernel so that an appropriately shaped interpolation kernel is used when generating each output pixel. In accordance with the preferred embodiment the kernel selection map contains indexes into a kernel LUT.

Mapping the Cleaned Kernel Selection Map to the Output Resolution:

The nearest neighbour (NN) mapping function is preferably used to obtain the kernel selection map at the required output resolution in accordance with the preferred embodiment of the present invention. NN mapping is used to reduce the computation cost associated with more complex mapping functions, such as a linear mapping function, without significantly reducing the output image quality.

Apply Interpolation Kernels Based on Kernel Selection Map to Obtain Output Image:

After the Kernel Selection Map is generated for each output pixel parameter, as shown in FIG. 7, values of one "universal" kernel are read from the Kernel Selection Map and that "universal" kernel is evaluated for the respective output pixel. The universal cubic interpolation kernel, in accordance with the preferred embodiment, is defined as follows:

$$h(s_x, s_y)_{0 \le \theta \le \pi/2} = \frac{1}{\sqrt{2}} \{h((1-2\theta/\pi)s_x + (2\theta/\pi)s_y)_{c=0.5} \cdot \tag{1}$$
$$h(((2\theta/\pi)s_x + (2\theta/\pi - 1)s_y)w(\theta))_{c=0}\}$$

$$h(s_x, s_y)_{\pi/2 < \theta < \pi} = \frac{1}{\sqrt{2}} \{h((2\theta/\pi - 1)s_x + (2\theta/\pi - 2)s_y)_{c=0.5} \cdot \tag{2}$$
$$h(((2\theta/\pi - 2)s_x + (1 - 2\theta/\pi)s_y)w(\theta))_{c=0}\}$$

where, $w(\theta)$ known as the across edge weighting factor is a smooth function constrained to pass through 1 when $\theta=0$, $\pi/2$, and $\pi$ and through ¾ when $\theta=\pi/4$ and $3\pi/4$. The weighting factor in accordance with a preferred embodiment is defined as follows:

$$w(\theta) = \frac{5}{4} - \left(\frac{1}{4}\cos(4\theta)\right) \tag{3}$$

Figure 25:
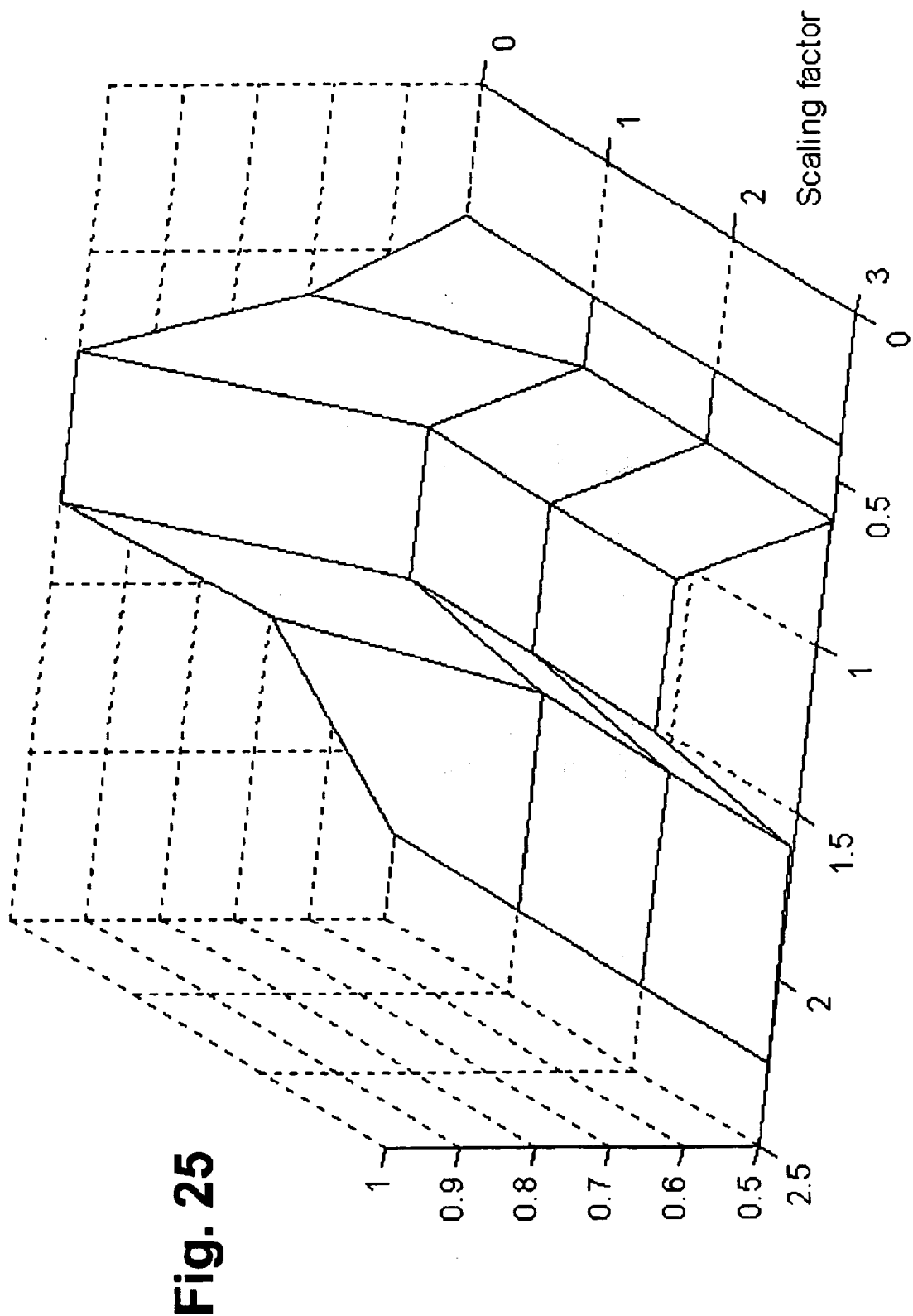
FIG. 25 shows a graph of the Kernel parameter c as a function of Edge Strength versus Scaling Factor in accordance with the preferred embodiment of the present invention.
Figure 26:
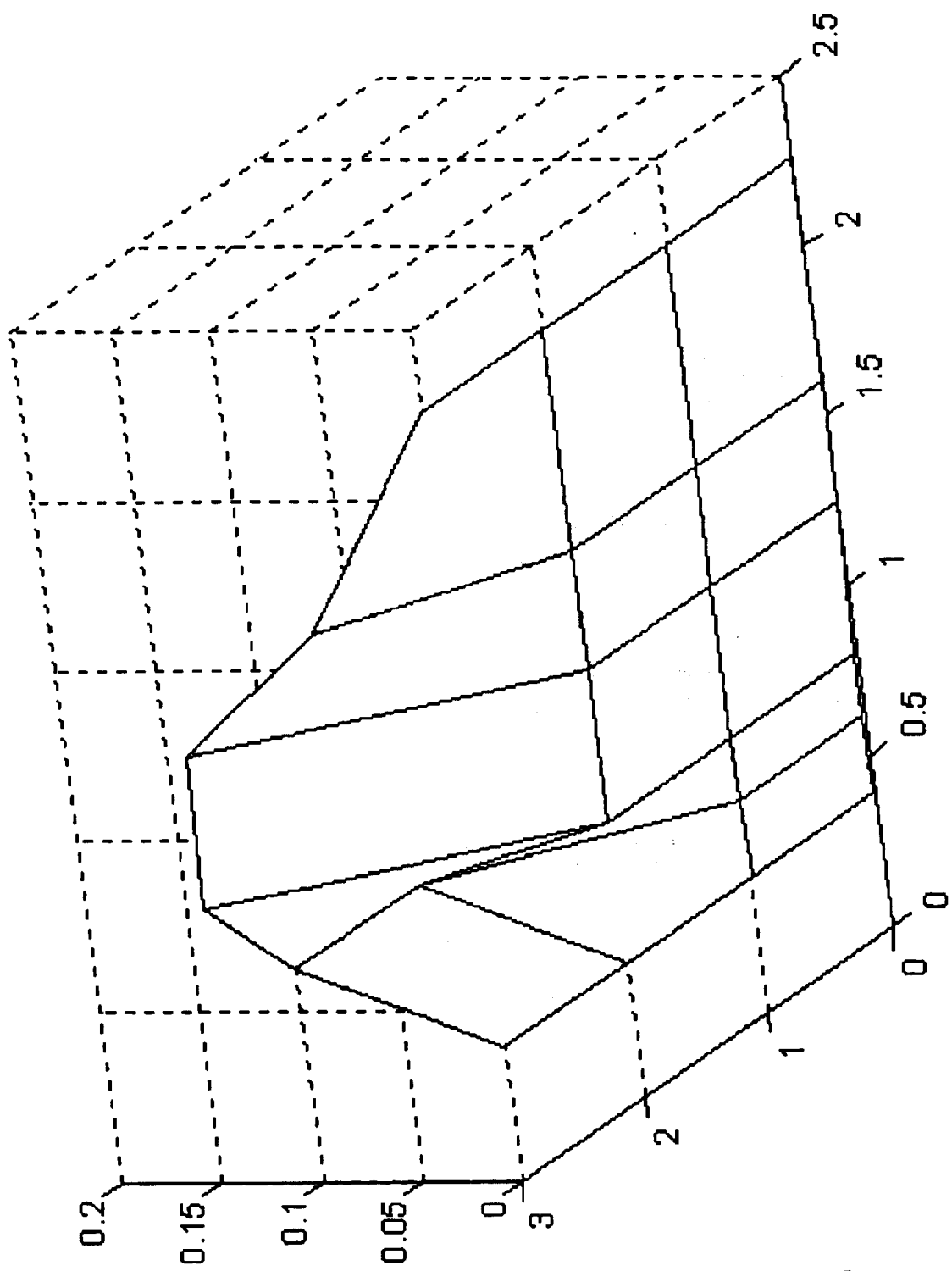
FIG. 26 shows a graph of the Kernel parameter d as a function of Edge Strength versus Scaling Factor in accordance with the preferred embodiment of the present invention.

In one dimension, (ie., for either row/column or across/along edge kernels), a modified cubic interpolation kernel, h(s), is given by:

$$h(s) = \begin{cases} 1, & 0 \leq |s| \leq d \\ \left(2 - \frac{3}{2}b - c\right)\left|\frac{s-d}{1-2d}\right|^3 + (-3 + 2b + c)\left|\frac{s-d}{1-2d}\right|^2 + \left(1 - \frac{1}{3}b\right), & d < |s| \leq 1 - d \\ 0, & 1 - d < |s| \leq 1 + d \\ \left(-\frac{1}{6}b - c\right)\left|\frac{s-3d}{1-2d}\right|^3 + (b + 5c)\left|\frac{s-3d}{1-2d}\right|^2 + (-2b - 8c)\left|\frac{s-3d}{1-2d}\right| + \left(\frac{4}{3}b + 4c\right) & 1 + d < |s| \leq 2 - d \\ 0, & \text{Otherwise} \end{cases} \quad (4)$$

where c and b are the two parameters of the Catmull-Rom cubic and d is the parameter controlling the width of the "dead zone" of the cubic interpolation kernel. FIGS. 25 and 26 show graphs of the kernel parameters c and d, respectively, as a function of Edge Strength versus Scaling Factor, in accordance with the preferred embodiment of the present invention. These graphed values for c and d are examplary and modifications and/or changes can be made thereto without departing from the scope and spirit of the present invention.

In accordance with the preferred embodiment of the present invention, the kernel selection map contains indices to a kernel LUT, which contains interpolation kernels defined by the user. The LUT allows the user to use a different set of kernels for different scaling factors.

In another embodiment of the present invention, the scaling factor is specified in terms of a rational fraction. For example, converting a 640×480 VGA image to a 1024×768 XVGA image requires a scaling factor of 1.6, which as a fraction is ⅘. The numerator of the re-sampling fraction is called the up-sample rate and the denominator the down-sample rate. Since the sample distances used to calculate coefficients of the universal cubic kernel, or any other continuous kernel, repeat every k output pixels, where k is the down-sample rate, the kernel coefficients required are preferably pre-calculated for a given down-sample rate and preferably stored in a LUT.

After a correct set of 4 by 4 coefficients are evaluated (or read from the kernel LUT,) for a kernel specified by the kernel selection map and for horizontal and vertical distances, the co-efficients are convolved with the corresponding set of 4 by 4 input pixels.

Down Sampling Offset Calculation

In accordance with a further embodiment of the present invention, optimal horizontal and vertical sampling offsets are calculated to make sure that the output sample points never land on any input sample point when down sampling. The preferred method of the further embodiment adds an offset of ½ the sampling distance to the vertical and horizontal sample distances when calculating the kernel coefficients. However, if an output grid point is exactly in the middle of two input grid points, the offset is calculated to be half the distance of the two output grid points. The offset ensures that the interpolated values never pass through the original points when down-sampling, and therefore low-pass filtering is always applied. The preferred method in accordance with the further embodiment significantly improves the performance of cubic interpolation at rational down-sampling factors such as ½, ⅓, ¼, etc and offers a small improvement in performance at other down-sampling ratios.

The optimum offsets are preferably calculated in accordance with the following C code:

```
/* Doubling the upsampling and downsampling ratios so the * overall scaling ratio,
xup/xdn and yup/ydn, remain the * same.
*/
ydn*=2;
yup*=2;
xdn*=2;
xup*=2;
/* Now calculate the offset*/
yoff=0;
if(ydn>yup) { /* if downsampling in y direction
        if {yup%4==0)/* output grid point in the middle of two *input grid points.*/
                yoff=1;
        else /* no output grid point in the middle of two input *grid points*/
                yoff=yup/2;
}
xoff=0:
if(xdn>xup) { /*if downscaling in x direction*/
        if (xup%4==0)/* output grid point in the middle of two *input grid points.*/
                xoff=1;
        else /* no output grid point in the middle of two input *grid points*/
                xoff=xup/2;
}
```

Local Output Clamping

Figure 8:
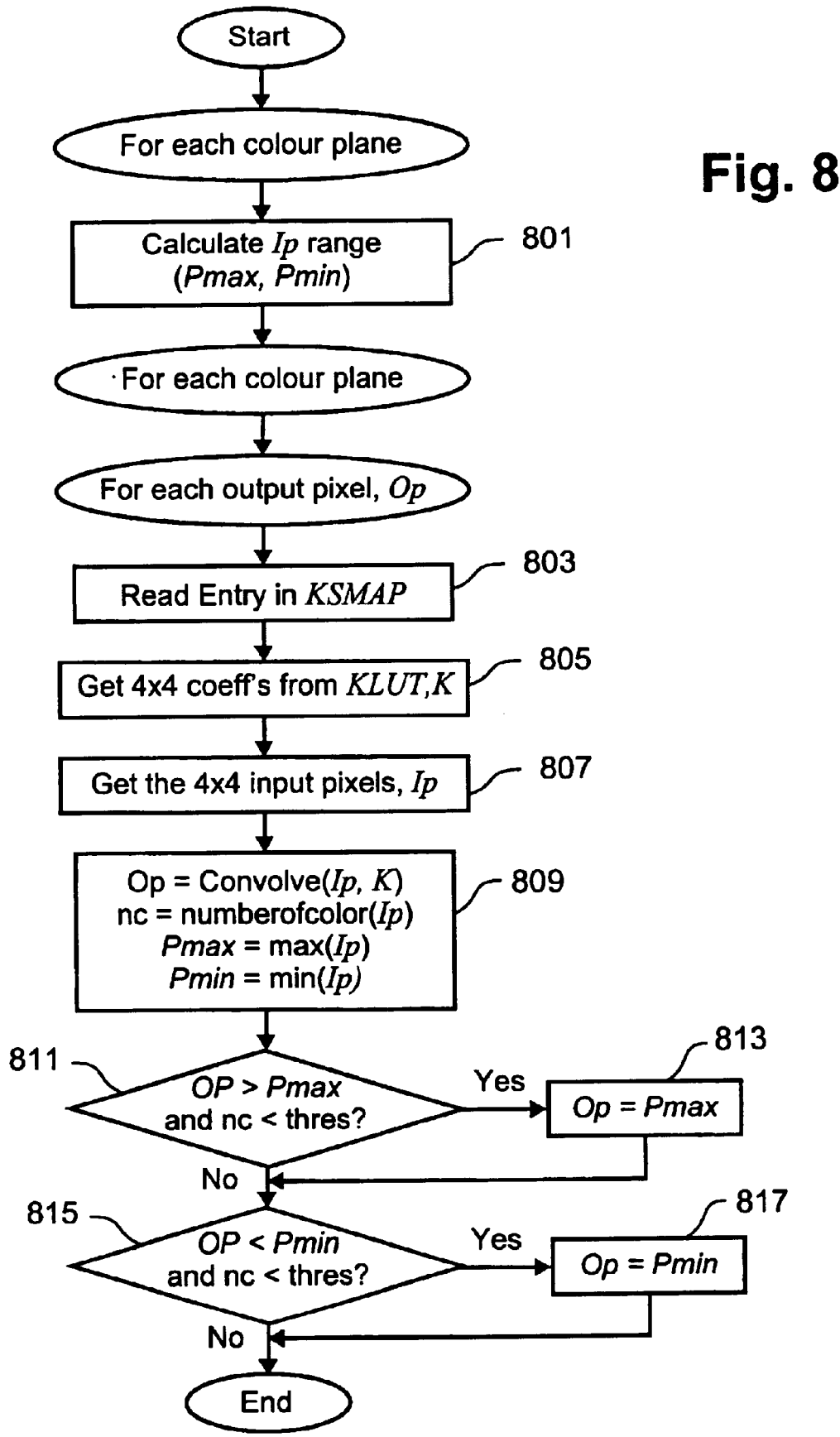
FIG. 8 is a flowchart showing a method of interpolation utilising local colour clamping in accordance with a further embodiment of the present invention.

FIG. 8 shows a flowchart showing a method of interpolation utilising local colour clamping in accordance with still a further embodiment of the present invention. In accordance with the further embodiment, interpolation with the universal cubic kernel requires a set of (4 by 4) kernel coefficients and the corresponding set of 4 by 4 input pixel values. To reduce the effects of any ringing (ie., over-shoots or under-shoots on sharp edges), that may be produced during the interpolation process of the preferred embodiment, a method of local output clamping can be applied during the interpolation. The process begins at step 801, where the local maximum and minimum value of the input pixels in all of the colour channels, up to 3×16 pixels are calculated. The following steps are then carried out for each output pixel $O_p$ in each colour plane. At the next step

803, values of one "universal" kernel are read from the Kernel Selection Map. The process continues at step 805, where the 4×4 coefficients are read from the kernel LUT and the "universal" kernel is evaluated for the respective output pixel, or read from the kernel LUT. At the next step 807, the corresponding 4 by 4 input pixel values are accessed. The process continues at the next step 809, where the (4 by 4) input pixel values are convolved with the corresponding kernel. At the next step 811, the number of colours in the set of 4 by 4 input pixel colour values are also counted. If the number of colours in the set is smaller than a certain threshold and if the interpolated output pixel value is larger than the local maximum, then the output value is replaced with the value of the local maximum, at step 813. The preferred threshold is equal to 8, which detects edges adjacent to smooth regions where any ringing artefacts are most visible. Alternatively, the process continues to step 815 and if the number of colours in the set is smaller than the threshold and if the output value calculated is less than the local minimum, then the output value is replaced with the local minimum, at step 817. Otherwise, the output is clamped between the maximum and minimum pixel values for the whole image. In accordance with the further embodiment, the local maximum and minimum are calculated over all the colour channels resulting in the prevention of coloured ringing, or colour bleeding, around sharp edges of one (primary) colour.

The method of colour clamping described above can be applied to any filtering process. For example, the process of colour clamping described above can be applied to an image sharpening (ie., enhancement) process.

EXAMPLE

Figure 9A:
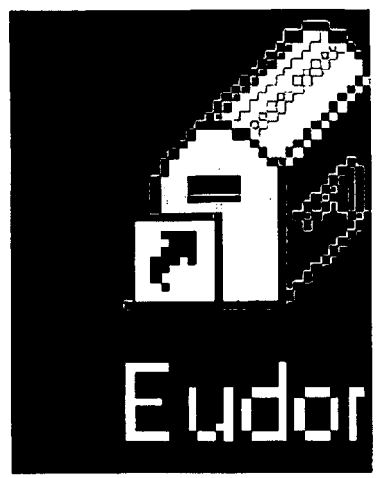
FIG. 9 shows a number output images resulting from the methods shown in FIGS. 1 to 8.
Figure 9B:
Figure 9C:
Figure 9D:
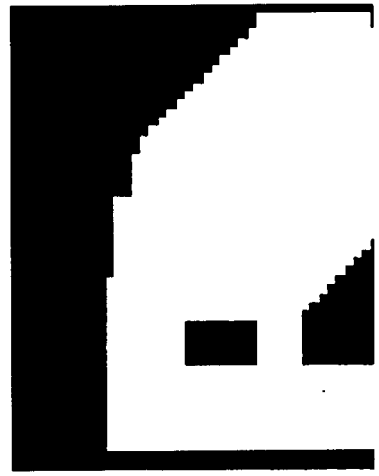
Figure 9E:
Figure 9F:
Figure 9G:
Figure 9H:
Figure 9I:
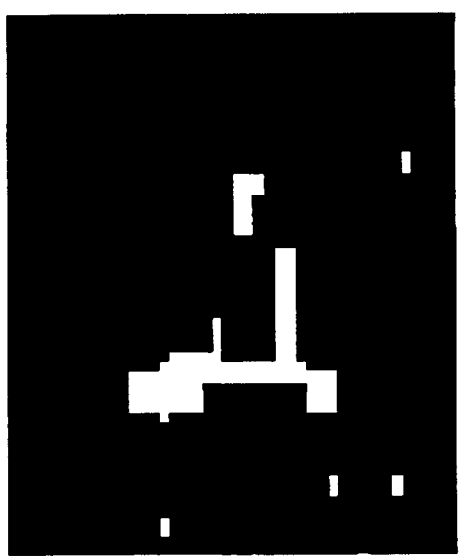
Figure 9J:
Figure 9K:
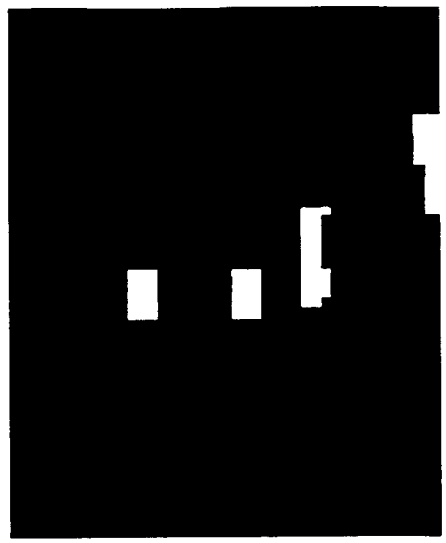
Figure 9L:
Figure 9M:
Figure 9N:

In order to illustrate the description of the preferred embodiments discussed above, the sub-images of FIG. 9 show an output resulting from each of the processes. FIG. 9(a) shows an original "Eudora mailbox" image. FIG. 9(b) shows an EdgeMap image, as a binary image for C>Te, created from the original "Eudora mailbox". The non-linear filter is shown to reliably detect all salient edges in the image. FIG. 9(c) shows the EdgeMap image after morphological dilation with Se_3. The dilation extends the boundaries of the EdgeMap so that pixels less than two pixels away from an actual edge are marked as an edge. FIG. 9(d) shows the EdgeMap image after morphological opening and closing with Se_4. The opening and closing operations remove any edge areas less than 4 by 4 in size, and fill non-edge areas less than 4 by 4 in size, respectively. Therefore, small edge areas that could be due to noise and filling or connecting adjacent edge areas are removed. FIG. 9(e) shows the horizontal edges contained in the cleaned EdgeMap and the quantisation of the edge angles, calculated by measuring edge strengths in horizontal and vertical directions, as defined in Table 5. FIG. 9(f) shows the diagonal edges contained in the cleaned EdgeMap. FIG. 9(g) shows the vertical edges contained in the cleaned EdgeMap. FIG. 9(h) shows the anti-diagonal edges contained in the cleaned EdgeMap. FIG. 9(i) shows the HorizEdge image, ie., areas in the cleaned EdgeMap that contain horizontal edges which are supported by their local neighbours. The horizontal edges are shown after cleaning with a morphological opening and closing and directional erosion to remove edge pixels not adjacent to edges of the same direction has been carried out. FIG. 9(j) shows the DiagEdge image, ie., areas in the cleaned EdgeMap that contain diagonal edges which are supported by their local neighbours. FIG. 9(k) shows the VertEdge image, ie., areas in the cleaned EdgeMap that contain vertical edges which are supported by their local neighbours. FIG. 9(l) shows the AntidiagEdge image, ie., areas in the cleaned EdgeMap that contain anti-diagonal edges which are supported by their local neighbours. FIG. 9(m) shows the ShortEdge image, ie., areas in the cleaned EdgeMap that contain short non-supported edges. Short edges are defined to be edges in the EdgeMap that are not contained in either the horizontal, diagonal, vertical, or anti-diagonal edge maps. FIG. 9(n) shows the kernel selection map indicating which interpolation kernel is used in which area of the original image. Colour assignments are as follows:

Black=smooth (Edgemap=0);
White=non-directed edges (ShortEdge=1);
Red=horizontal edges (HorizEdge=1);
Yellow=diagonal edges (DiagEdge=1);
Blue=vertical edges (VertEdge=1);
Green=anti-diagonal edges (AntidiagEdge=1);

Note: For simplicity the four different edge strengths are not shown in the final kernel selection map, ie., the final kernel selection map is effectively a kernel selection map with only two edge strengths (EdgeMap=[0, 1]).

The aforementioned preferred methods comprise a particular control flow. There are many other variants of the preferred methods which use different control flows without departing from the spirit or scope of the present invention. Furthermore one or more of the steps of the preferred methods can be performed in parallel rather sequentially.

Figure 10:
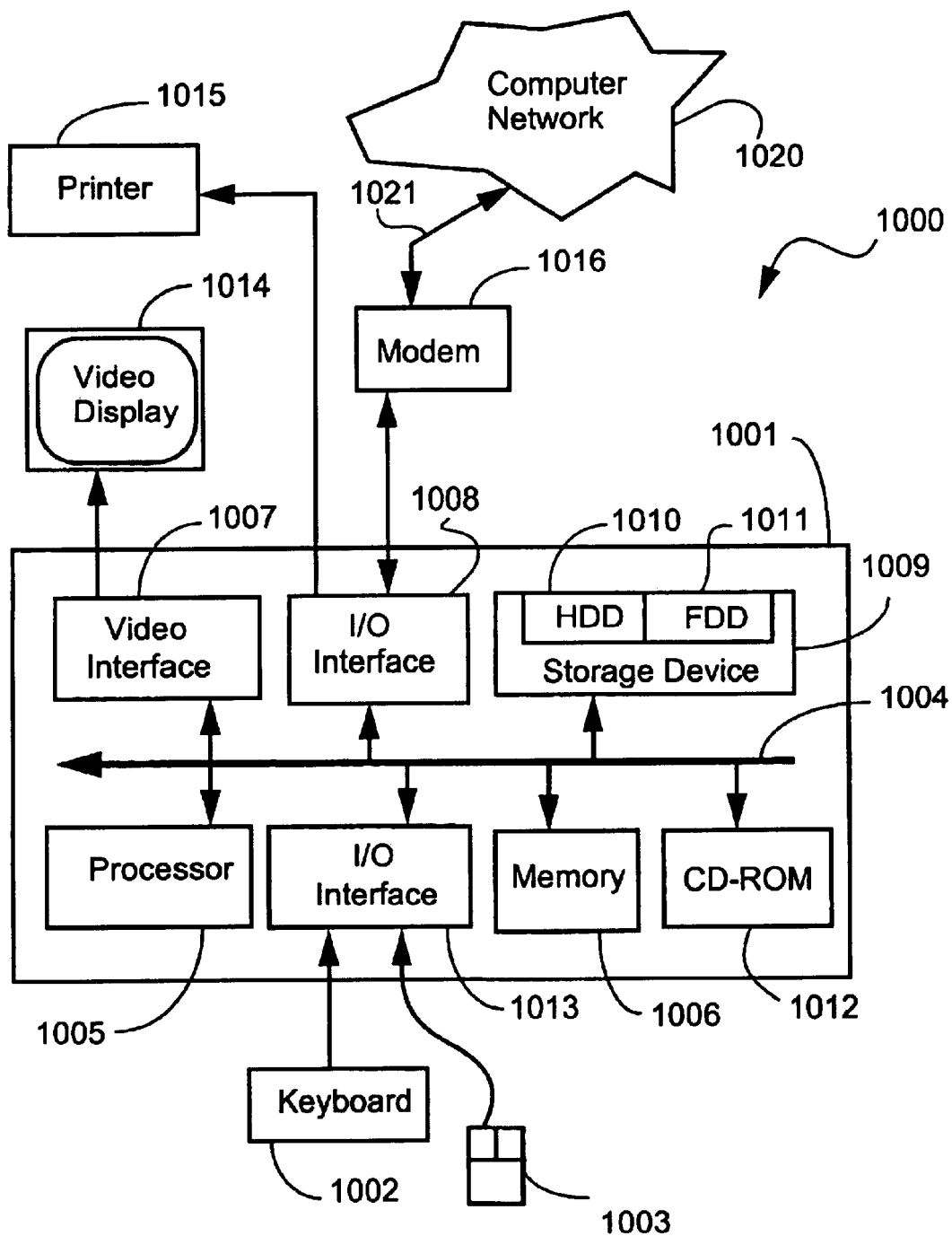
FIG. 10 is a schematic block diagram of a general purpose computer upon which the preferred embodiment of the present invention can be practiced.

The method of image interpolation is preferably practiced using a conventional general-purpose computer system 1000, such as that shown in FIG. 10 wherein the processes of FIGS. 1 to 8 can be implemented as software, such as an application program executing within the computer system 1000. In particular, the steps of the method of image interpolation are effected by instructions in the software that are carried out by the computer. The software can be divided into two separate parts; one part for carrying out the image interpolation methods; and another part to manage the user interface between the latter and the user. The software can be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for image interpolation in accordance with the embodiments of the invention.

The computer system 1000 comprises a computer module 1001, input devices such as a keyboard 1002 and mouse 1003, output devices including a printer 1015 and a display device 1014. A Modulator-Demodulator (Modem) transceiver device 1016 is used by the computer module 1001 for communicating to and from a communications network 1020, for example connectable via a telephone line 1021 or other functional medium. The modem 1016 can be used to obtain access to the Internet, and other network systems, such as a Local Area Network (LAN) or a Wide Area Network (WAN).

The computer module 1001 typically includes at least one processor unit 1005, a memory unit 1006, for example formed from semiconductor random access memory (RAM) and read only memory (ROM), input/output (I/O) interfaces including a video interface 1007, and an I/O interface 1013 for the keyboard 1002 and mouse 1003 and optionally a joystick (not illustrated), and an interface 1008 for the modem 1016. A storage device 1009 is provided and typically includes a hard disk drive 1010 and a floppy disk drive 1011. A magnetic tape drive (not illustrated) may also be used. A CD-ROM drive 1012 is typically provided as a non-volatile source of data. The components 1005 to 1013 of the computer module 1001, typically communicate via an interconnected bus 1004 and in a manner which results in a conventional mode of operation of the computer system 1000 known to those in the relevant art. Examples of computers on which the embodiments can be practised include IBM-PC's and compatibles, Sun Sparcstations or alike computer systems evolved therefrom.

Typically, the application program of the preferred embodiment is resident on the hard disk drive 1010 and read and controlled in its execution by the processor 1005. Intermediate storage of the program and any data fetched from the network 1020 may be accomplished using the semiconductor memory 1006, possibly in concert with the hard disk drive 1010. In some instances, the application program may be supplied to the user encoded on a CD-ROM or floppy disk and read via the corresponding drive 1012 or 1011, or alternatively may be read by the user from the network 1020 via the modem device 1016. Still further, the software can also be loaded into the computer system 1000 from other computer readable medium including magnetic tape, a ROM or integrated circuit, a magneto-optical disk, a radio or infra-red transmission channel between the computer module 1001 and another device, a computer readable card such as a PCMCIA card, and the Internet and Intranets including email transmissions and information recorded on websites and the like. The foregoing is merely exemplary of relevant computer readable mediums. Other computer readable mediums may be practiced without departing from the scope and spirit of the invention.

The method of image interpolation can alternatively be implemented in dedicated hardware such as one or more integrated circuits performing the functions or sub functions of FIGS. 1 to 8. Such dedicated hardware can include graphic processors, digital signal processors, or one or more microprocessors and associated memories. A preferred hardware architecture for carrying out the image interpolation method in accordance with the above-described embodiments will now be described.

Figure 11:
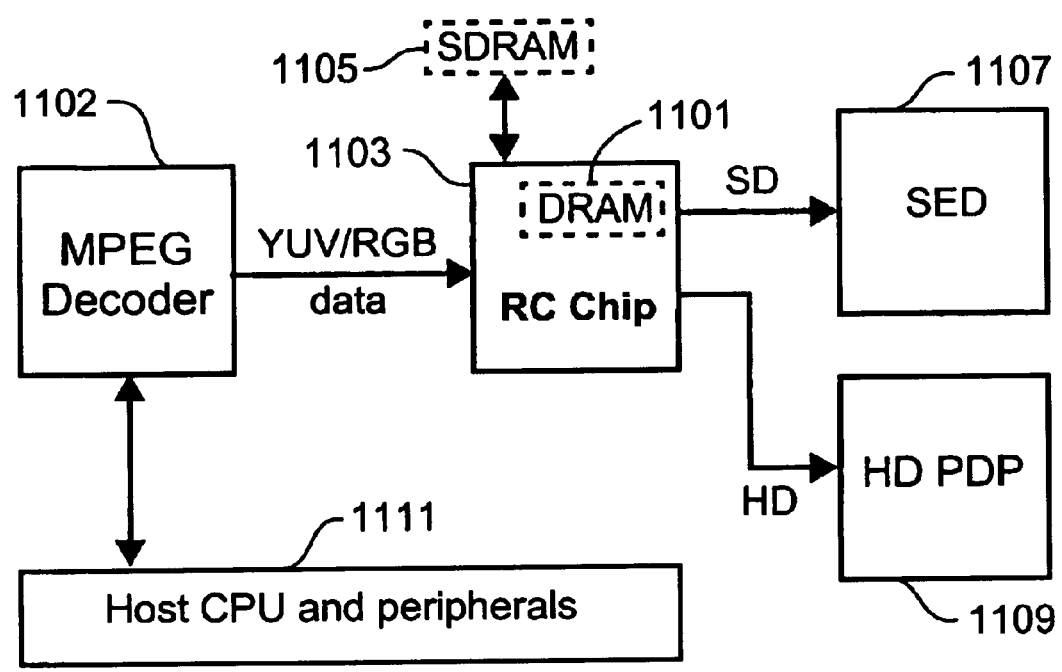
FIG. 11 shows a preferred hardware architecture for implementing the method of FIG. 1 as used in DTV.

FIG. 11 shows the preferred hardware architecture 1103 (hereinafter the 'RC Chip'), as preferably used in a DTV system. An MPEG decoder 1102 accepts compressed video image data from an an external source (not illustrated) and decompresses the data For example, the processor 1005 of the computer system 1000 can supply compressed video image data to MPEG decoder 1102. The image data, in either RGB or YUV format, is then fed into the RC Chip 1103 to perform de-interlacing, frame rate conversion, spatial re-sampling and colour compensation if required. The RC Chip 1103 can store a frame of the input image in embedded DRAM 1101 or some external SDRAM frame buffer 1105. The output image is then fed into a Surface Emission Display (SED) 1107 if the output is in a standard definition (SD), or a high-definition Plasma Display (PDP) 1109, if the output is in high definition. Both the MPEG decoder 1102 and the RC Chip 1103 are preferably configured by the host CPU 1111.

Figure 12A:
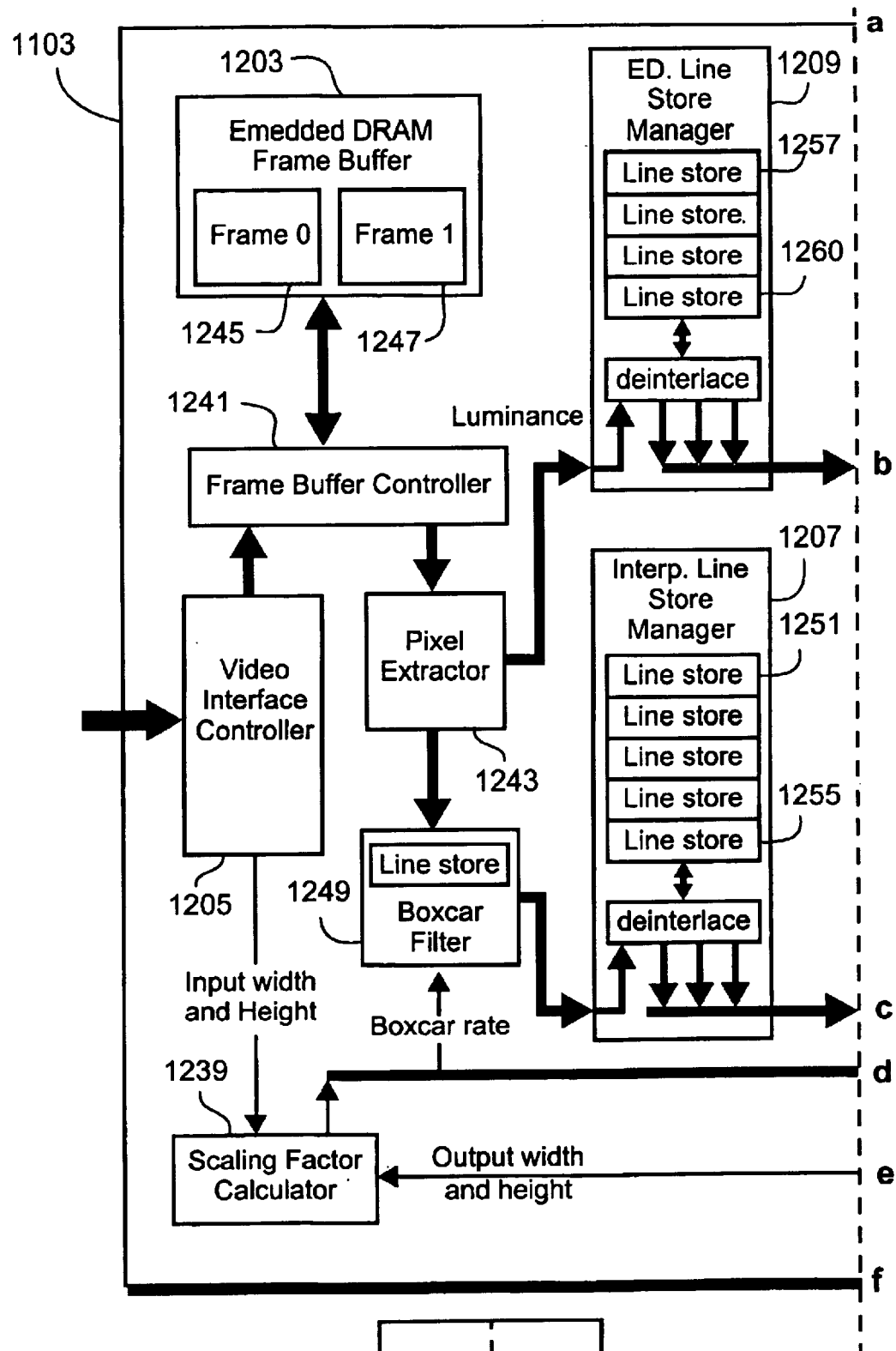
FIG. 12 shows the preferred hardware architecture for implementing the image interpolation method of FIG. 1.
Figure 12B:
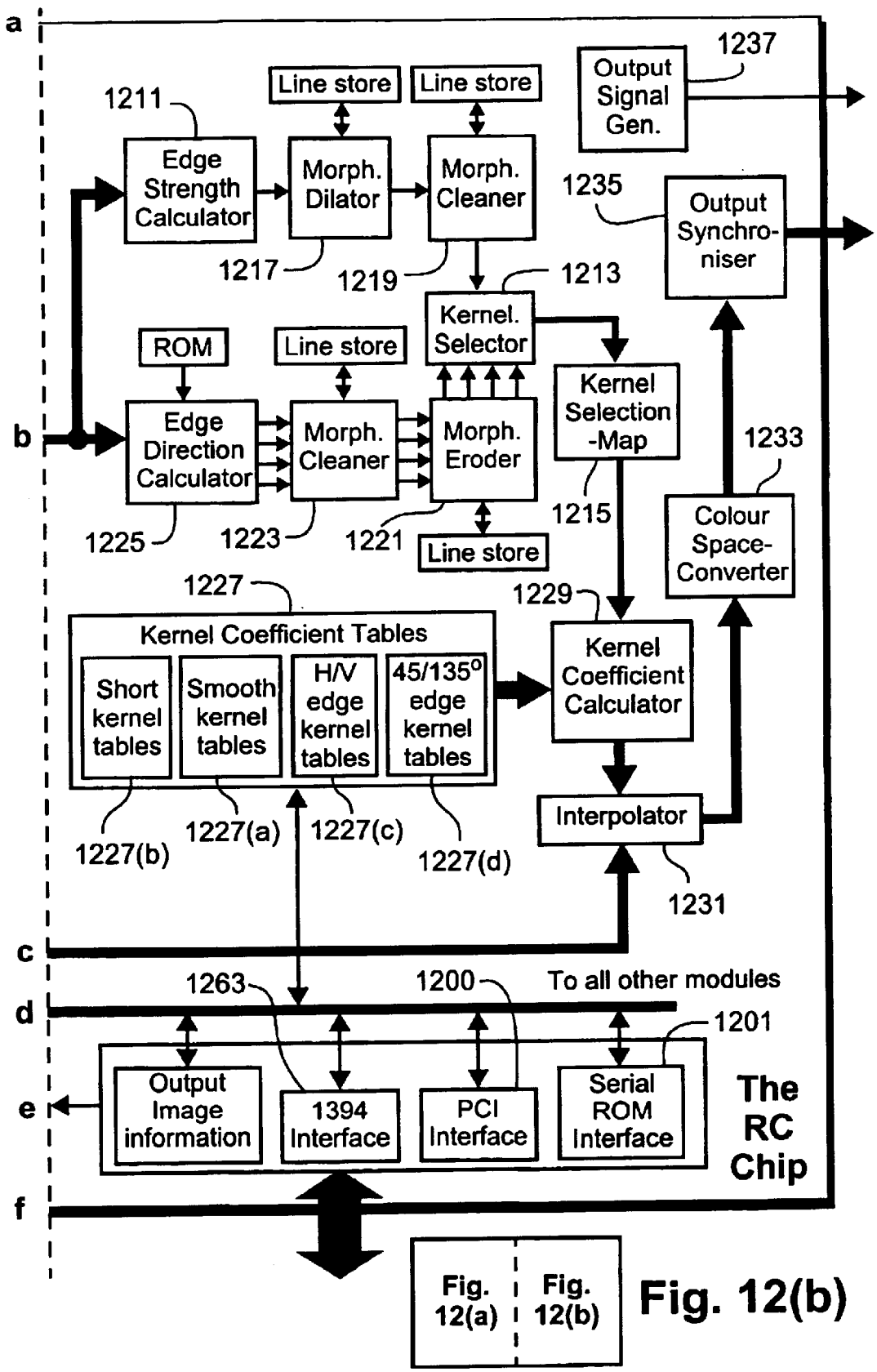

FIG. 12 shows the hardware architecture of the RC Chip 1103 for carrying out the image interpolation method in accordance with the preferred embodiment. Before normal operation, the RC chip 1103 needs to be initialised by a serial ROM 1201, or by the host CPU 1111 via the a PCI interface 1200. Any suitable microprocessor interface can be used in the RC Chip 1103. The host CPU 1111 writes the kernel coefficients into the Kernel Coefficient Tables 1227, the output width and height and the output time step into output image information, and sets up various registers in all the modules 1203 to 1255 of the RC Chip 1103 via the PCI interface 1200.

When pixel data arrives at the RC chip 1103, a Video Interface Controller (VIC) 1205 accepts the pixel data and writes the data into embedded frame buffers 1203. Alternatively, the frame buffers 1203 could be external. At the same time, pixels are read out of the embedded frame buffers 1205 at the system clock rate. The pixels then go to either interpolation modules (1207, 1227, 1229 and 1231), or edge detection modules (1209 to 1225). An Edge Strength Calculator (ESC) 1211 calculates the edge strength of all input pixels using its 3×3 neighbourhood, while an Edge Direction Calculator (EDC) 1209 determines the direction of edges where they exist. The outputs of both the Edge Strength Calculator 1211 and Edge Direction Calculator 1209 go through some morphological cleaning operations in morphological modules 1211, 1217, 1219, 1221, 1223 and 1225. The results of the edge detection are combined in a Kernel Selector (KS) 1213 and stored in a Kernel Selection Map (KSM) 1215.

After the Kernel Selection Map 1215 is generated, an Interpolation Line Store Manager (ILSM) 1207 begins to read pixels from the frame buffer 1203. A Kernel Coefficients Calculator (KCE) 1229 reads the kernel type from the Kernel Selection Map 1215, and using that information the KCC 1229 it reads kernel coefficients from the Kernel Coefficients Tables 1227. The kernel coefficients are then multiplied with the input image pixel in the Interpolator 1231. The output of the Interpolator 1231 is converted into another colour space in a Colour Space Converter 1233 if necessary. An Output Synchroniser 1235 collects one line of output pixels from the Colour Space Converter (CSC) 1233 and outputs them at the rate of an output pixel clock (not illustrated). An Output Timing Signal Generator 1237 generates an output line sync and page sync signal, as required by the output display.

The following paragraphs describe in detail how the various blocks in FIG. 3 are implemented to perform the functionality described above. The following paragraphs also include a discussion of some of memory requirements and clock rate required for the preferred hardware architecture.

The Video Interface Controller (VIC) 1205 is responsible for receiving pixel data from an image source (eg. an MPEG decoder). The VIC 1205 writes the pixel data into an embedded (or external) frame buffer 1203 with appropriate addresses. The pixel data is considered valid when both the line sync and page sync signals are asserted at the rising edge of an input pixel clock (not illustrated). The polarities of both line sync and page sync are programmable. The VIC 1205 is synchronous to the input pixel clock. If required, the VIC 1205 can be equipped with Analogue to Digital Converters (ADCs) to convert analog image data into digital form. Filters like a Comb Filter can be added to separate various components from composite signals. When the input image is interlaced, the VIC 1205 stores the image in an interleaved manner. Pixels from the odd field of a frame only go to odd lines of the frame buffer 1203, and even field to even lines.

The VIC 1205 is also responsible for determining the input image width and height. When the VIC 1205 receives the first frame from an image source, the VIC 1205 uses the pixel clock, line sync and page sync signals to count the number of active pixels in a line and the number of active lines in a page. The result of the counts is fed to a Scaling Factor Calculator 1239. During operation the current image width and height are constantly checked against the previous width and height. If a difference is detected, a new scaling factor is calculated to reflect the change. The ability to check the current image width and height and to calculate a new scaling factor automatically optimises the input image to the output display, and allows the user to switch between image sources in a seamless way. In a zoom mode, the VIC 1205 only accepts pixels that are required to produce the output image, which reduces the number of write requests the VIC 1205 generates to a Frame Buffer Controller (FBC) 1241, and the storage required.

The Frame Buffer Controller 1241 is responsible for handling frame buffer 1203 requests from the Video Interface Controller 1205 and a Pixel Extractor 1243. The Frame Buffer Controller 1241 collects read and write requests from both the Video Interface Controller 1205 and a Pixel Extractor 1243, and performs burst read and write operations to the frame buffers 1203. The FBC 1241 contains a DRAM interface (not illustrated) and logic to convert internal bus request signals to DRAM interface signals. The FBC 1241 also has read and write data FIFOs (not illustrated) to collect read and write data. The write circuitry is synchronous to the input pixel clock, and the read circuitry is synchronous to the main system clock (not illustrated).

If the frame buffer 1203 cannot be embedded in the chip, the frame buffer 1203 can be implemented outside the chip and the FBC 1241 can be replaced with an external SDRAM interface (not illustrated). Other functionality of the FBC 1241 remains the same. The FBC 1241 is also responsible for switching frame buffers 1245 and 1247 to implement nearest neighbour frame rate conversion. The FBC 1241 accepts a time step value from a user, which represents the ratio of input frame rate/output frame rate. The FBC 1241 includes a time counter (not illustrated), which is reset to 0 when the RC Chip 1103 is reset and gets incremented by the time step value whenever the RC Chip 1103 outputs a frame. The FBC 1241 determines which input frame in the frame buffer 1203 is to be interpolated next by the content of the time counter.

When the time step value is less than 1 (ie. the input frame rate is slower than the output frame rate), some frames need to be replicated. The next frame buffer to be read is determined by the integer part of the time counter. If the integer part of the time counter (after truncation) is even, the FBC 1241 reads from frame buffer 0 (1245). Otherwise, it reads from frame buffer 1. When the FBC 1241 is reading from one frame buffer, the write circuitry will only write into the other frame buffer.

When the time step value is more than 1 (ie. the input frame rate is faster than the output frame rate), some input frames need to be dropped. When one input frame is written into one of the frame buffers 1245 or 1247, the time counter is incremented with a step value. If the next frame required is not the frame right after the current frame, then the content of that frame will be dropped. The process continues until the required frame arrives. The next frame required is determined by the integer part (after truncation) of the time counter. The FBC 1241 can on average write one pixel and read two pixels in one clock cycle.

The Embedded Frame Buffer 1203 is a 'ping-pong' buffer that stores the current incoming frame in one of its two frame buffers 1245 or 1247, while allowing the rest of the RC chip 1103 to perform resolution conversion on the previous frame in the other frame buffer. The ping-pong buffer switching is described in the following paragraphs. The size of the two frame buffers 1245, 1247 depends on the maximum resolution of the input image. If the maximum resolution of the input image is that of high definition (HD) TV, then the size of the frame buffers is 2×2048×1080×24 bits (ie. about 100 Mbits) for 3-channel RGB pixels. The size is reduced to 64 Mbits if the input is 4:2:0 YUV. Alternatively, the frame buffer can be implemented using external SRAM (eg. PC133 SRAM). Pins need to be allocated for the external SRAM interface.

The access time of the frame buffer 1203 needs to be small enough to support the processing rate of the rest of the logic, which depends on the input pixel rate and the main system clock frequency. If the maximum input rate is from 60 Hz interlaced HDTV, then the input pixel clock will be at a rate of about 60 MHz. To support an average read of 2 pixels and A write of 1 pixel per cycle, A memory bandwidth of 180 Mpixels/sec is required (ie. 540 Mbytes/sec). On a 72 bit-wide memory bus, the above-mentioned memory bandwidth translates to 60 million accesses per second, which can be handled by most known embedded DRAM modules or external PC133 SRAM.

A Scaling Factor Calculator 1239 is responsible for finding the optimum up-sampling and down-sampling rates for both horizontal and vertical image resizing. The optimum rates have to satisfy the following conditions, where $w_{in}$ and $h_{in}$ are the input width and height, respectively; $w_{out}$ and $h_{out}$ are the output width and height; $up_h$ and $down_h$ are the optimum horizontal up-sampling and down-sampling rates; and $up_v$ and $down_v$ are the optimum vertical up-sampling and down-sampling rates:

$up_h$ is less than or equal to some maximum up-sampling rate;

$up_h/down_h - w_{out}/w_{in}$ is smallest for all $up_h$ between 1 and the maximum up-sampling rate, $up_v$ is less than or equal to some maximum up-sampling rate; and $up_v/down_v - h_{out}/h_{in}$ is smallest for all $up_v$ between 1 and maximum up-sampling rate.

The following pseudo code can be implemented in the Scaling Factor Calculator (SFC) 1239 to find the optimum up-sampling and down-sampling rates in accordance with the preferred embodiment.

```
maxerr = +inf;
up_opt = 0;
down_opt = 0;
for (up = 1; up <= maxup; up++) {
    down = up*win/wout;
    down = floor(down);
    err = up*win - down*wout;
    if (err < maxerr) {
        up_opt = up;
        down_opt = down;
    }
}
```

The SFC 1239 is required to deal with the following special cases:

1. When the horizontal or vertical scaling factor is less than ¼, a boxcar filter section 1249 is used to pre-filter the input image before it is scaled by the Interpolator 1231. As discussed above, Table 1 illustrates the size of a preferred boxcar pre-filter used over the range of scaling factors handled by the current algorithm. The size along the rows or the columns can be specified separately.

After pre-filtering, the actual horizontal and vertical scaling factors can be modified accordingly. Please note that in accordance with the present invention, when the boxcar filter is used, only cubic interpolation is performed on the pre-filtered image. No edge detection is performed, and no steerable kernels are used. The quality of the image is not decreased by only performing cubic interpolation.

2. When the input image is interlaced and the vertical scaling factor is less than ½, de-interlacing is not performed on the image, and the vertical down-sampling is halved instead. Again the quality of the output image is not decreased, and the processing procedure is greatly simplified. When boxcar filtering is applied on an interlaced image, it should only be applied to pixels in the same field, and no de-interlacing should be needed.

3. When the horizontal-scaling factor is less than 0.75, the horizontal up-sampling rate $up_h$ and down-sampling rate $down_h$ are doubled so the actual scaling factor $up_h/down_h$ remains the same. Doubling the sampling rates allows the offsets to be added to the calculation of the re-sampled output pixel, which prevents any output sample from landing on any original sample. The same procedure is performed when the vertical scaling factor is less than 0.75.

Apart from calculating the optimum horizontal up-sampling and down-sampling ratios, the SFC 1239 also calculates the optimum horizontal and vertical sampling offsets. These offsets are added to the x and y coordinates of output sample points so that they do not land on any of the input sample points. When the scaling factor (horizontal or vertical) is less than 0.75, the offset is preferably calculated as half the number of up-sample points between two input samples which as discussed above, represents ½ of the distance between two input samples. If the offset itself is even, then the offset is further subtracted by 1. The SFC 1239 is implemented to be synchronous to the main system clock.

The Pixel Extractor (PE) 1243 reads pixels out of the frame buffer 1203 row by row, and feeds them to the Edge Detection Line Store Manager(EDLSM) 1209 and the Interpolation Line Store Manager (ILSM) 1207. The Pixel Extractor 1243 responds to stall signals from both the line store managers 1209 and 1207 and stops supply of pixels in the clock cycle after the stall signal is asserted. FIFOs (not illustrated) are placed inside the PE 1243 to buffer extra pixels so that THE PE 1243 can perform A burst read from the frame buffer 1203.

When both line store managers 1209 and 1207 are requesting pixels from the PE 1243, they are serviced in a round-robin manner. However, the memory bandwidth from the frame buffer 1203 should be high enough so that the PE 1243 can supply one pixel per clock cycle to both line store managers 1207 and 1209 simultaneously. The maximum pixel rate that the PE 1243 needs to supply to both line store managers 1207 and 1209 is that of the pixel rate of 60 Hz interlaced HDTV (ie. 30×2048×1080 pixels/sec), about 60 Mpixels per second. Therefore, the throughput from the frame buffer 1203 to the PE 1243 should be at least 120 Mpixels/sec.

The PE 1243 obtains the input image width and height from the Video Interface Controller 1205 to correctly fetch pixels from the frame buffer 1203. In addition, the PE 1243 keeps track of the locations of the last pixels that are fetched for both line store managers 1207 and 1209. When the input is interlaced, the PE 1243 keeps track of which field it is fetching from, and generates its address to the frame buffer 1203 accordingly.

The PE 1243 is run in synchronous to the main system clock. When the input image is interlaced and the vertical scaling ratio is less than 0.5, the PE 1243 fetches pixels from one field only. So interpolation is performed on pixels in the same field. If the vertical scaling ratio is greater than 0.5, the odd and even fields are preferably interleaved together, ie. one row from the odd field is followed by one row from the even field, and vice versa. The PE 1243 is also responsible for finding the luminance of the input pixels and feeding the luminance to the EDLSM 1209. If the input image is in YUV format, then the PE 1243 only needs to feed the Y channel to the EDLSM 1209. If the input image is in RGB format, then THE PE 1243 creates a luminance channel (Y') using a rational approximation to the luminance defined in YUV, as defined by the following equation:

$$Y' = \tfrac{1}{2}G + \tfrac{1}{4}R + \tfrac{1}{4}B.$$

The Boxcar Filter (BF) section 1249 is responsible for pre-filtering the input image before the input image is further down-sampled by the Interpolator 1231. A boxcar filter of width k and height l can be represented by a matrix with k columns and l rows, and all coefficients equal to 1/(k*l). For example, a boxcar filter of dimension 3×3 can be represented by the matrix below.

$$\tfrac{1}{9}\begin{bmatrix} 1 & 1 & 1 \\ 1 & 1 & 1 \\ 1 & 1 & 1 \end{bmatrix}$$

In accordance with the preferred embodiment, a boxcar filter is applied to a block of k×l pixels to reduce them to only 1 pixel, as discussed above. The preferred embodiment is different from the conventional methods of applying the filter by sliding the filter across an image. If a boxcar filter of dimension k×l is applied to an image of dimension m×n, then the output image will be shrunk to a dimension of $\lceil m/k \rceil \times \lceil n/l \rceil$. When m is not a multiple of k, the image is reflected on the right edge. When n is not a multiple of l, the image is reflected on the bottom edge. In accordance with the preferred embodiment, the width and height of the boxcar filter 1249 are determined by the horizontal and vertical scaling factors (s and t respectively), as discussed above.

Figure 13:
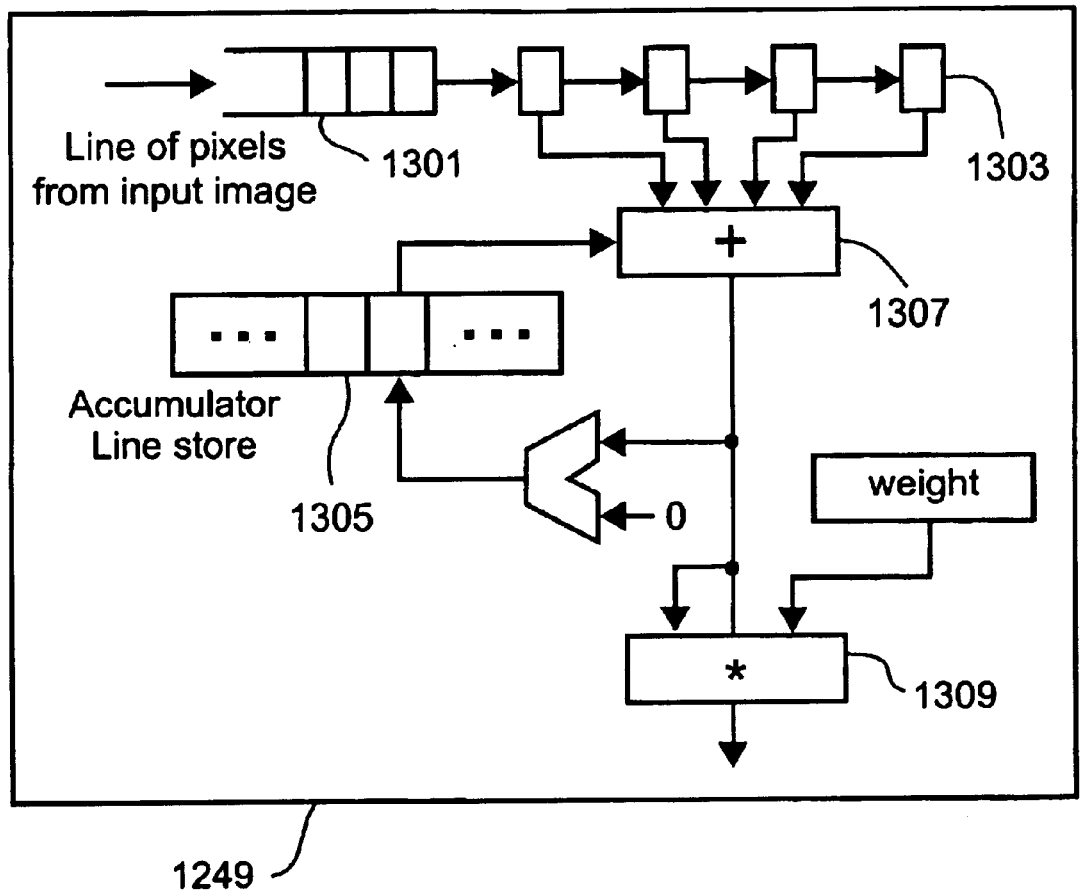
FIG. 13 shows the preferred hardware architecture for implementing boxcar filtering in accordance the method of FIG. 1.

FIG. 13 shows the preferred method of implementing boxcar filtering. The BF 1249 is synchronous to the main system clock. To implement a k×l boxcar filter, pixels from the input image are stored in a FIFO 1301. The pixels are read from the other end and put into a shift register 1303. After k pixels have been read from the FIFO 1301, their sum is calculated by a summing unit 1307, and then stored in the accumulator line store 1305. After the first line of pixels is processed, the second line of pixels are then processed in a similar way. The only difference, however, is that when the nth sum of k pixels is multiplied with the horizontal weight, the result is added with the $n^{th}$ value in the accumulator line store 1305. The sum is then written back to the $n^{th}$ place in the accumulator line store 1305 as the new accumulator value. Therefore, all the partial sums are accumulated. At the $l^{th}$ line of pixels, the accumulator value is multiplied with the weight using a multiplying unit 1309, which should be 1/k*l, and 0 should be written into the accumulator line store 1305. The product is the final output of the boxcar filter 1249.

In accordance with the preferred boxcar filter, the maximum length of the line store is the maximum image width. Also, the preferred boxcar filter can accept input pixels at every clock cycle. To minimise the logic used, a slow adder 1307 and multiplier 1309 are preferably used. Every addition and multiplication has a minimum of two clock cycles to complete.

The Interpolation Line Store Manager (ILSM) 1207 accepts pixels from the Pixel Extractor 1243 and stores the pixels in the local line stores 1251–1255. The ILSM 1207 is also responsible for sending pixels to the Interpolator 1231. If the input image is interlaced, the ILSM 1207 also de-interlaces the image. There are five line stores 1251–1255 in the ILSM 1207. In the duration of processing one line the ILSM 1207 writes the pixel from the PE 1243 to one of the line stores 1251. At the same time, the ILSM 1207 reads pixels at the same location as the written pixel from the other four line stores 1252–1255. When the input line store 1251 is full, the line store containing the least recent line is selected to accept the next incoming line. Therefore, the line stores, 1251–1255, contain the most recent lines from PE 1243 to the ILSM 1207.

The ILSM 1207 operates strictly in a one-in-one-out fashion. The ILSM 1207 accepts one pixel per cycle from the PE 1243, and sends four pixels to the Interpolator 1231, unless the stall signal from the Interpolator 1231 is asserted. When the stall signal from the Interpolator 1231 is asserted, the ILSM 1207 stalls sending pixels in the next cycle, and transmits a stall signal back to the PE 1243.

Figure 14:
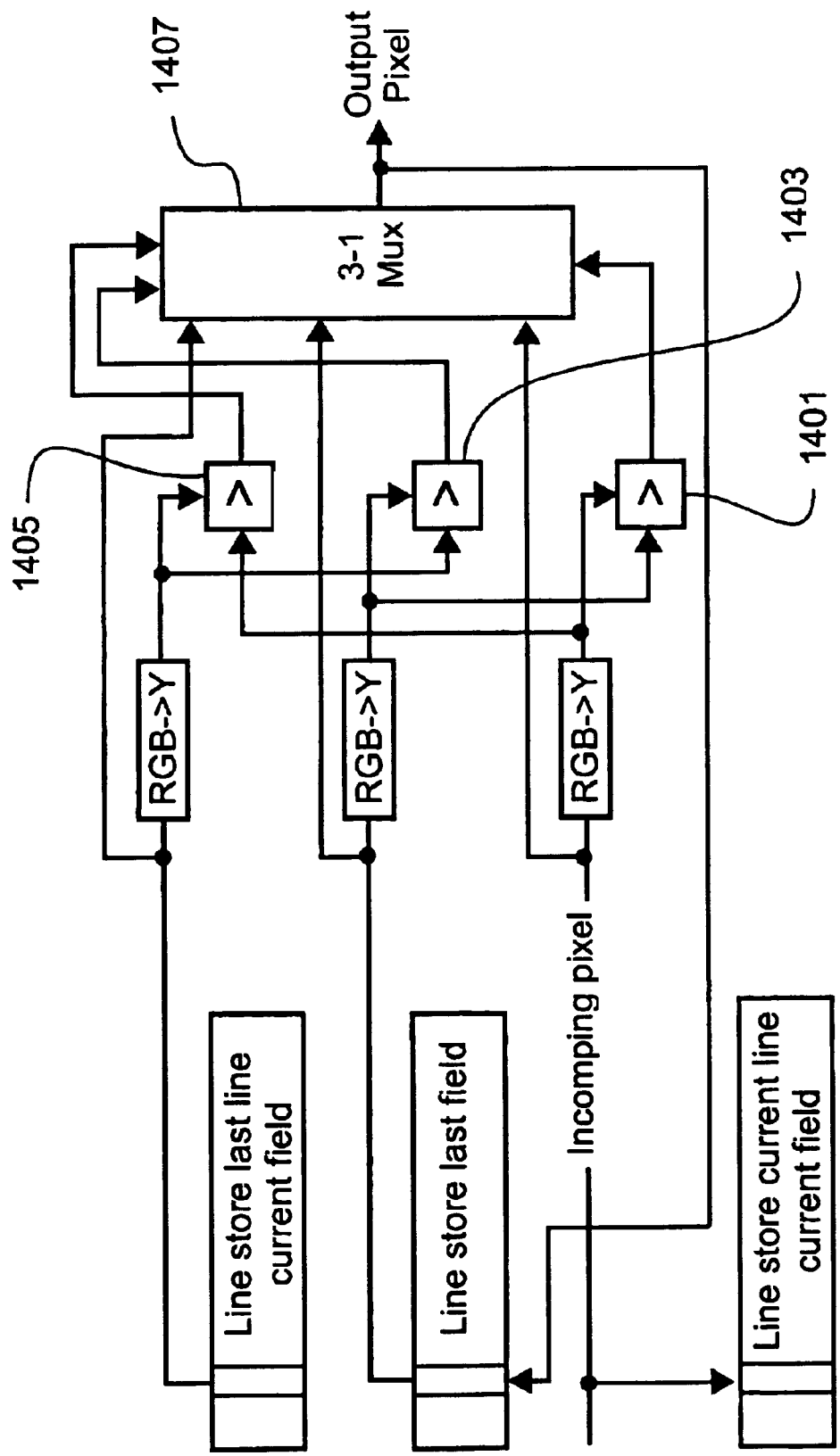
FIG. 14 shows an architecture used for de-interlacing in accordance with the method of FIG. 1.

When the input image is interlaced, the ILSM 1207 de-interlaces the image. The preferred embodiment utilises a median filter method for de-interlacing the image. There are other methods of de-interlacing. However, the median filter is the most efficient and easiest to implement. Intra-frame de-interlacing methods can also be implemented using the spatial methods discussed above. In the median filtering method, a missing pixel is reconstructed by finding the median of the pixels above, and below the missing pixel, as well as the pixel in the same location in previous frame. FIG. 14 shows an architecture used for de-interlacing in accordance with the preferred embodiment. When a pixel at coordinates (x,y) is read from the PE 1243, the pixel is stored in one of the line stores 1251–1255. At the same time, the ILSM 1207 reads the pixel just above the incoming pixel in the current field at coordinates (x,y)–l), and also reads the pixel at the missing location in the last field, from two of the other four line stores 1252–1255. The luminance of these three pixels are fed into 3 comparators 1401, 1403 and 1405, and the outputs of the comparators 1401–1405 control the operation of a 3-to-1 multiplexer 1407, as described in Table 3 below.

TABLE 3

| A > B | B > C | C > A | Output |
|---|---|---|---|
| 0 | 0 | 1 | B |
| 1 | 0 | 0 | C |
| 1 | 0 | 1 | A |
| 0 | 1 | 0 | A |
| 0 | 1 | 1 | C |
| 1 | 1 | 0 | B |

The output of the de-interlacing architecture, shown in FIG. 14, in accordance with the preferred embodiment is the median of the three pixels. The line stores 1251–1255 are preferably long enough to store the widest image coming into the RC chip 1103. If the widest image comes from HDTV, then each line store 1251 . 1255 needs to be able to store 2048 3-channel pixels, ie. 3×2048 bytes. Therefore, 5 line stores would take 30 kbytes. For 4:2:0 YUV input pixels, the size of the line stores is reduced to 20 kbytes. Alternatively, when the width of the input image is smaller than the maximum width, the ILSM 1207 can be implemented so that it can store more than 1 line in one line store. Storing more than 1 line in one line store means that the ILSM 1207 can store more than 5 lines with the available memory. The ILSM 1207 is preferably implemented so as to be synchronous to the main system clock.

The Edge Detection Line Store Manager (EDLSM) 1209 accepts luminance pixels from the PE 1243 and stores the pixels in the local line stores 1257–1260. The EDLSM 1209 is also responsible for sending pixels to the Edge Strength Calculator 1211 and Edge Direction Calculator 1225, where edges are detected and their direction calculated. If the input image is interlaced, the EDLSM 1209 also de-interlaces the image if required. There are 4 line stores in the EDLSM 1209. In the duration of processing one line, the EDLSM 1209 writes the pixel from the PE 1243 to one of the line stores 1257. At the same time, the EDLSM 1209 reads pixels at the same location from the other 3 line stores 1258–1260, and sends the pixels to the edge detection modules 1211 and 1225. When the receiving line store is full, the line store containing the least recent line is selected to accept the next incoming line. In accordance with the preferred embodiment, the line stores always contains the most recent lines from the PE 1243 to the EDLSM 1257.

The EDLSM 1257 operates strictly in a one-in-one-out fashion. Generally, the EDLSM 1257 accepts one pixel per cycle from the PE 1243, and sends 3 pixels to the edge detection modules 1211 and 1225, unless the stall signal from the one of these modules 1211 and 1225 is asserted. When that happens, the EDLSM 1257 stalls sending pixels in the next cycle and transmits that stall signal back to the PE 1243. The Edge Strength Calculator 1211 and the Edge Direction Calculator 1225 preferably operate in synchronous with one another, such that the respective stall signals should be the same.

If the input is interlaced, the EDLSM 1257 de-interlaces the image. However, no RGB-to-Y conversion is required because the pixel contains luminance already. The line stores 1257–1260 are preferably long enough to store the widest image coming into the RC chip 1103. If the widest image comes from HDTV, then each line store 1257–1260 needs to be able to store 2048 pixels, ie. 2048 bytes. Therefore, 4 line stores would take 8 kbytes. Optionally, when the width of the input image is smaller than the maximum width, the EDLSM 1209 can be implemented so that it can store more than 1 line in one line store. Storing more than 1 line in one line store means that the EDLSM 1209 can store more than 4 lines enabling edge detection and angle calculation with larger kernels to be performed. The EDLSM 1209 operates synchronously with the main system clock.

Figure 15:
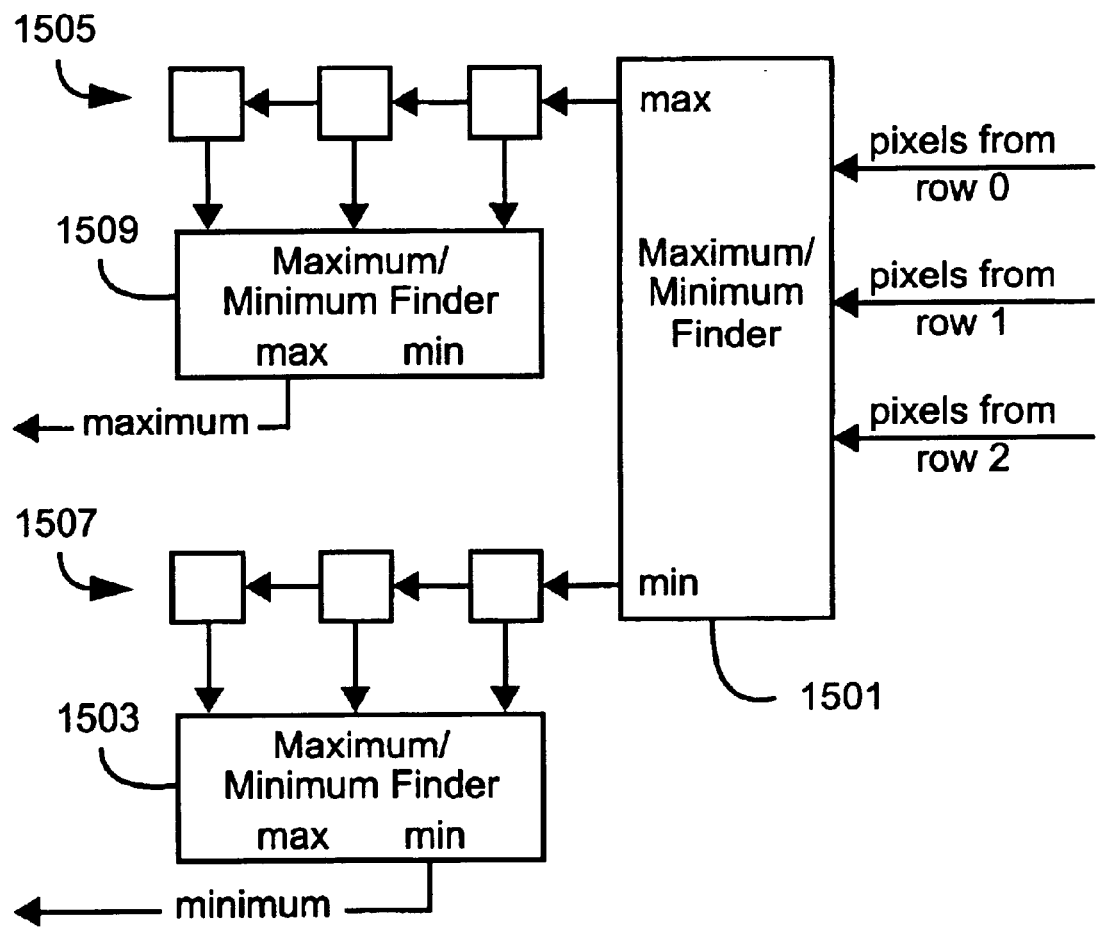
FIG. 15 shows the preferred hardware architecture for finding the maximum/minimum of a pixel 3×3 neighbourhood in accordance with the method of FIG. 1.
Figure 16:
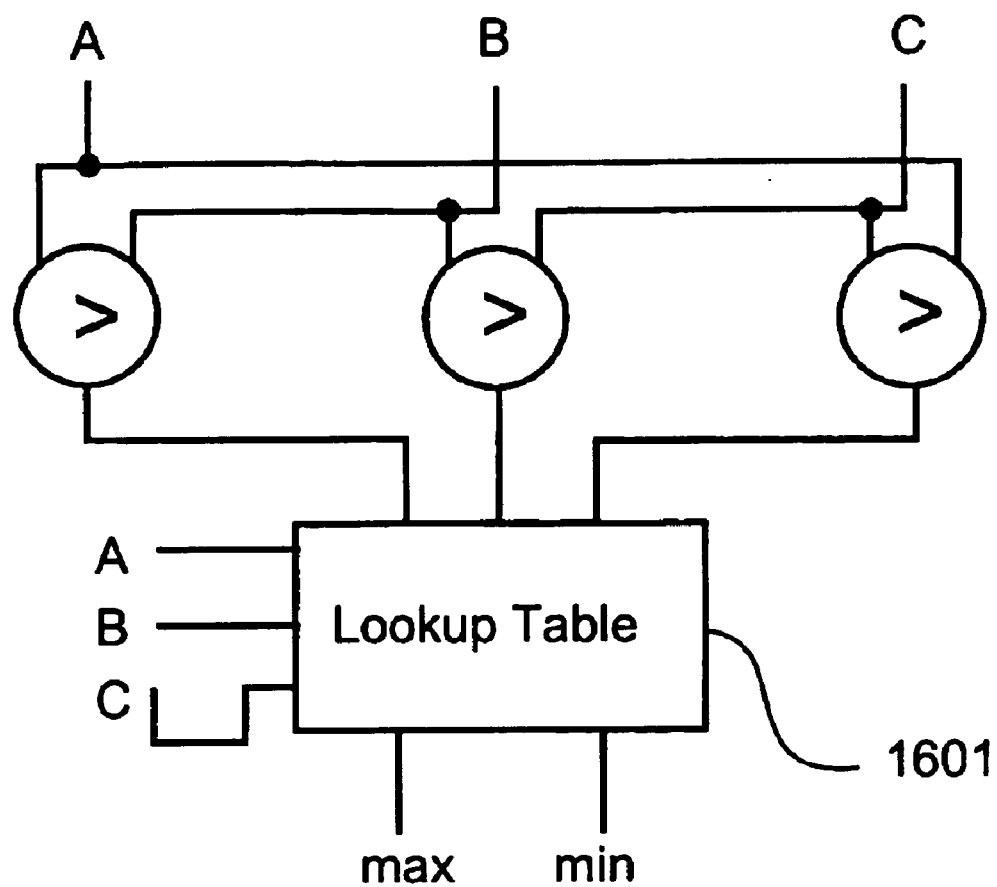
FIG. 16 shows the preferred hardware architecture for implementing a single stage maximum/minimum finder in accordance with the method of FIG. 1.

The Edge Strength Calculator (ESC) 1211 is responsible for calculating the edge strength of each input pixel using a non-linear filter on the 3×3 neighbourhood around the pixel. The maximum/minimum of a pixel 3×3 neighbourhood can be found by the circuit in FIG. 15. The three columns of pixels are each fed into a maximum/minimum finder 1501 and their respective minimum/maximum are found. The minima of these finders are fed a 3-stage shift register 1507, and the maximum into another shift register 1505. The 3 outputs of the minimum shift register 1507 are fed into another maximum/minimum finder 1503, and the minimum output of that is the minimum of the region. Similarly, the 3 outputs of the maximum shift register 1505 are fed into another maximum/minimum finder 1509, and the minimum output of that is the minimum of the region. The single stage maximum/minimum finders can be implemented with a circuit shown in FIG. 16. The lookup table operation is described in Table 4.

TABLE 4

| A > B | B > C | C > A | Minimum | Maximum |
|---|---|---|---|---|
| 1 | 1 | 0 | C | A |
| 0 | 1 | 1 | A | B |
| 1 | 0 | 1 | B | C |
| 0 | 0 | 1 | A | C |
| 1 | 0 | 0 | B | A |
| 0 | 1 | 0 | C | B |

Figure 17:
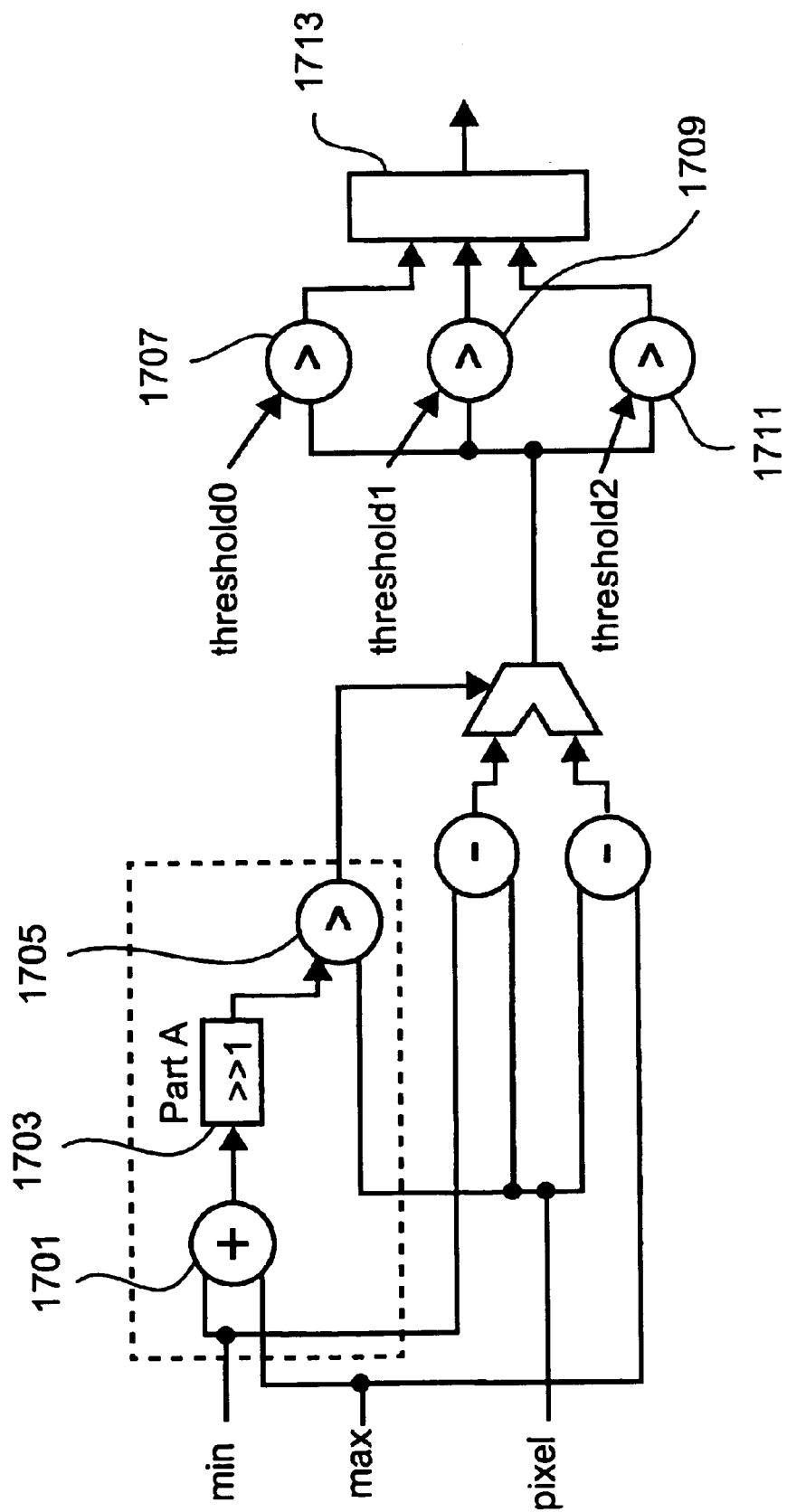
FIG. 17 shows the preferred hardware architecture for determining which kind of edge pixel the pixel in the middle of a 3×3 neighbourhood is in accordance the method of FIG. 1.

After finding the maximum and minimum of the neighbourhood, the circuit shown in FIG. 17 determines which kind of edge pixel the pixel in the middle is in accordance with the preferred embodiment of the present invention. Part A of the circuit includes an adder 1701, a 'greater than one' section 1703 and a comparator 1705. Part A of the circuit determines whether the centre pixel is closer to the maximum. If the centre pixel is closer to the maximum, then the difference between the centre pixel and the minimum is used to compare against the thresholds using three comparators 1707, 1709,1711 and an encoding block 1713. If the centre pixel is closer to the minimum, then the difference between the maximum and the centre pixel is used instead. The output of the comparators 1707, 1709 and 1711 are encoded at the end to give the edge type. The thresholds are preferably 64, 128 and 192. The ESC 1211 is synchronous to the main system clock and is preferably able to determine the edge type of one input pixel per clock cycle.

Figure 18:
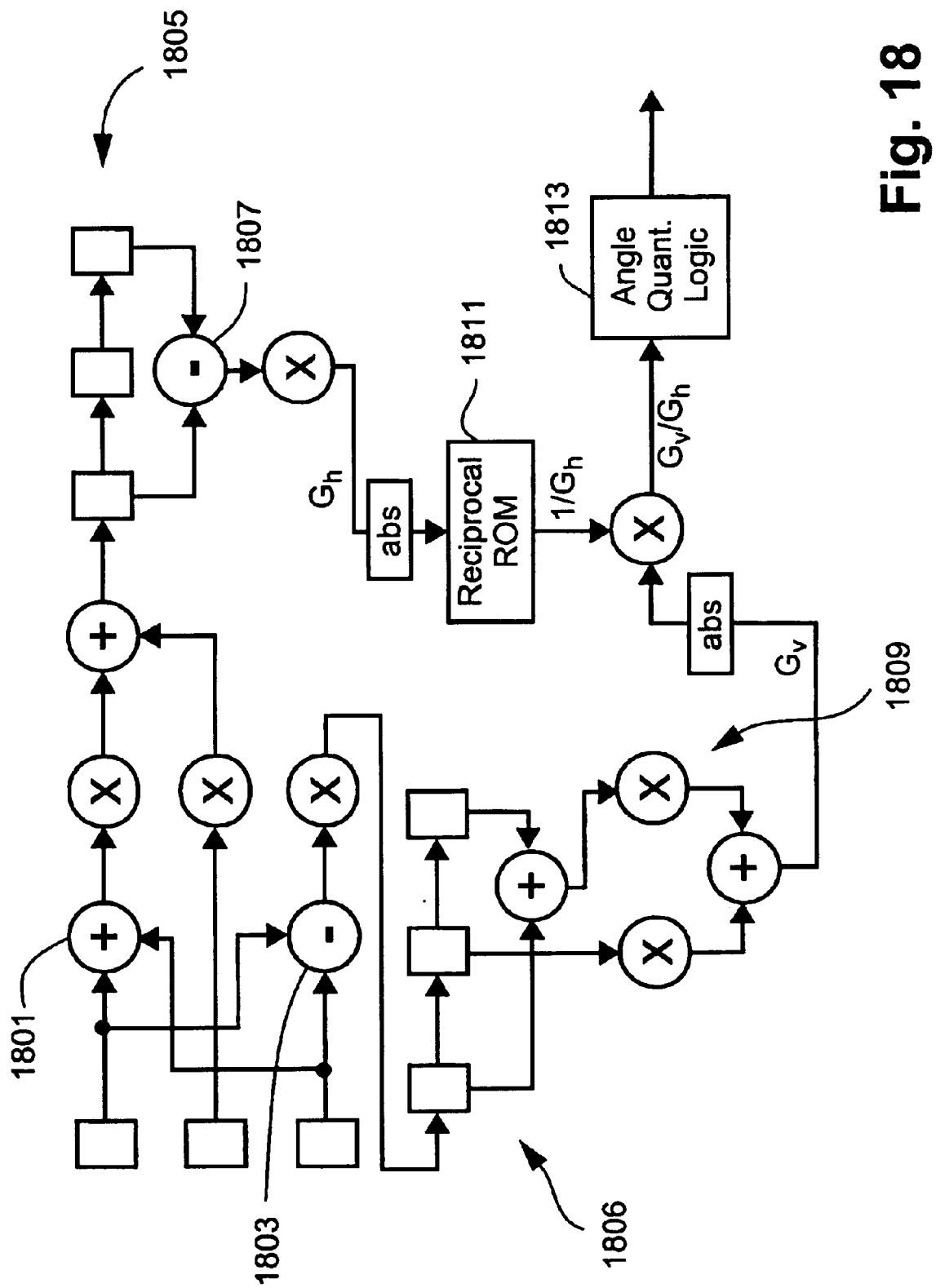
FIG. 18 shows the preferred hardware architecture for implementing the Edge Direction Calculator of FIG. 12.

FIG. 18 shows the architecture of the Edge Direction Calculator (EDC) 1225 in accordance with the preferred embodiment. The EDC 1225 is responsible for finding the directions of edges in the input image. The EDC 1225 applies two 3×3 separable kernels to a column of 3 input pixels and calculates the quotients between the results from the above operations. The quotient is then compared with a set of thresholds to determine the direction. A high pass filter 1803 and a low pass filter 1801 are applied to the pixels. The outputs of the filters 1801 and 1803 are fed into two 3-stage shift registers 1805 and 1806, respectively. The 3 entries of the low pass filter result register 1805 are fed into a high pass filter 1807 to calculate the horizontal edge strength ($G_h$). The 3 entries in the high pass filter result register 1806 are fed into a low pass filter 1809 to calculate the vertical edge strength ($G_v$). The absolute value of the horizontal edge strength is fed into a reciprocal ROM 1811 and the reciprocal of $G_h$ is multiplied with $G_v$ to find the quotient. The quotient $G_v/G_h$ is fed into the angle quantisation logic 1813 to find out which of the 4 directions the particular edge is in. The angle quantisation logic 1813 is made up of a number of comparators (not illustrated) and an encoder (not illustrate) that encodes the results of the comparators into edge type.

The angle quantisation logic can be described by the following C code:

```
G=arctan(Gv/Gh);
if (((G>=-pi/20) && (G<=pi/20))||((G>19*pi/20) && (G<-19*pi/20)))
    angle=0;  // horizontal edge
else if (((G>pi/20) && (G<=9*pi/20))||((G<-11*pi/20) && (G>=-19*pi/20)))
    angle=1;  // diagonal edge
else if (((G>9*pi/20) && (G<=11*pi/20))||((G<-9*pi/20) && (G>=-11*pi/20)))
    angle=2;  // vertical edge
else // if (((G>pi/20) && (G<=9*pi/20))||((G<-11*pi/20) && (G>=-19*pi/20)))
    angle=3;  // anti-diagonal edge
```

The EDC 1225 generates one angle type per clock cycle and operates synchronously with the main system clock.

Figure 19:
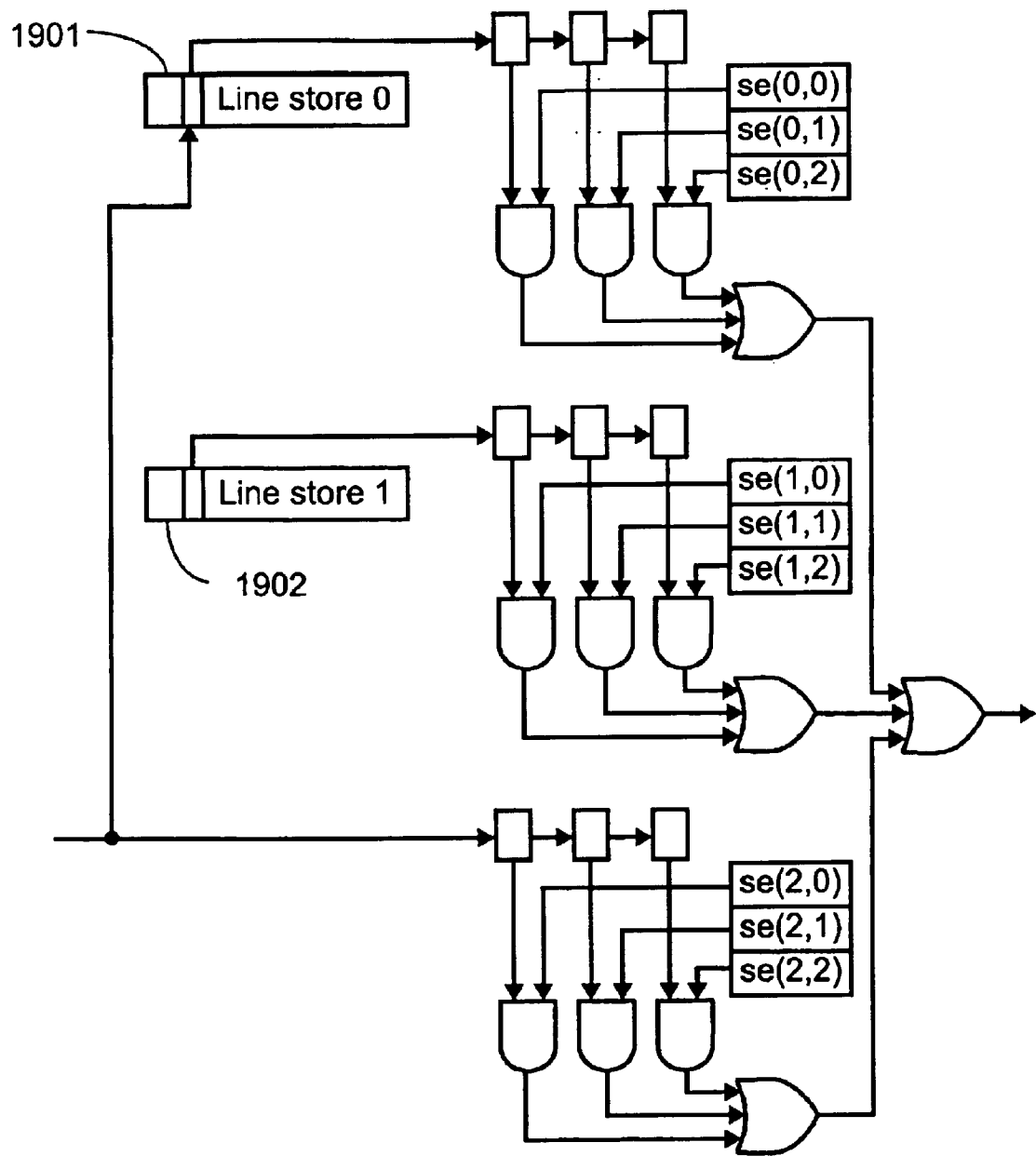
FIG. 19 shows the preferred hardware architecture for implementing the Morphological Dilator of FIG. 12.
Figure 20:
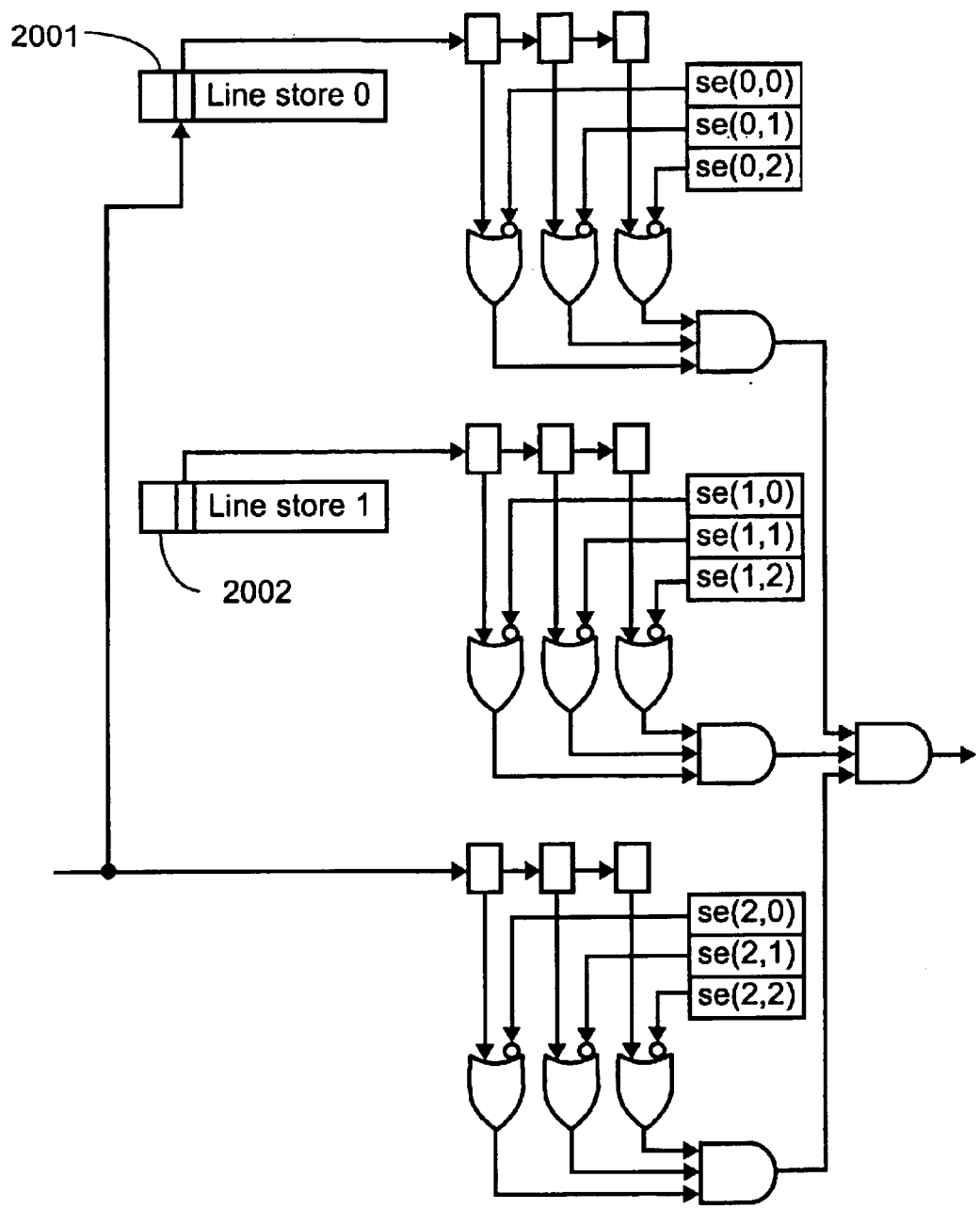
FIG. 20 shows the preferred hardware architecture for implementing the Morphological Eroder of FIG. 12.

After the edge strength is found by the Edge Strength Calculator 1217, the Morphological Dilator (MD) 1217 dilates the edge map with a 3×3 structuring element before the edge map is morphologically opened and closed. After the edge direction maps are found they are morphologically opened and closed. The edge maps are eroded with their respective 3×3 structuring element by a Morphological Eroder (ME) 1221. FIG. 19 shows the preferred implementation of the MD 1217 with two 1-bit line stores 1901 and 1902. FIG. 20 shows the implementation of the ME 1221 with 2 1-bit line stores 2001 and 2002.

In accordance with the preferred embodiment the edge strength map and the edge direction maps are cleaned by morphological open and close operations. The morphological opening operations fit the structuring element on the image. If all pixels under the 1's in the structuring element are 1 then the 1's can stay. If one of them is 0 then all the other 1's are changed to 0. Conventional methods of fitting the structuring element on the image use morphological dilation and erosion, but this is costly in terms of the number of line stores required. For rectangular structuring elements with all 1's the method can be simplified to a template fitting method that uses a fewer number of line stores. The following Matlab code describes the template fitting algorithm in accordance with the preferred embodiment.

```
% in opening, if the structuring element fits, then the marks stay
for i=1:size(ipad,1)
    pixel_cnt=0;
    for j=1:size(ipad,2)
        if ipad(i,j)==match
            pixel_cnt=pixel_cnt+1;
            if pixel_cnt>se
                pixel_cnt=se;
            end
        else
            pixel_cnt=0;
        end
        if j>=se
            if pixel_cnt==se
                good=1;
            else
                good=0;
            end
            if i>=se
                if (good==1) & (ls_in(j-se+1)==se-1)
                    ocode(i-se+1,j-se+1)=1;
                elseif (i>se) & (((good==0) & (Is_in(j-se+1)==se-1) & (ls_out(j-se+1)==se-1)) | ls_out(j-se+1)>0)
                    ocode(i-se+1,j-se+1)=1;
                else
                    ocode(i-se+1,j-se+1)=0;
                end
            end
            if good==1
                if ls_in(j-se+1)==se-1
                    ls_out(j-se+1)=se;
                end
                ls_in(j-se+1)=ls_in(j-se+1)+1;
                if ls_in(j-se+1 )>se-1
                    ls_in(j-se+1)=se-1;
                end
            else
                ls_in(j-se+1)=0;
            end
            ls_out(j-se+1 )=ls_out(j-se+1)-1;
            if ls_out(j-se+1)<0
                ls_out(j-se+1)=0;
            end
        end
    end
end
```

In the above code, 'se' represents the width of the structuring element, which is also the height of the structuring element in this case. In accordance with the preferred embodiment of the present invention se is equal to 4. If the pixel is 1, then the pixel counter pixel_cnt is incremented. If the pixel is 0, the pixel counter is reset. If the pixel counter equals se, the sequence of 1's is considered to be 'good'. There are two line stores, ls_in and ls_out, which stores temporary results. The line store ls_in keeps track of where the 'good' sequences start, and the number of lines that have such 'good' sequences of 1's at that position. If the number of lines having 'good' sequences at the same position equals se, then the structuring element template fits, and so the output can start to generate 1's in those positions. The line store ls_out keeps track of where the logic needs to generate 1's, and the number of lines that need to be generated. At the beginning of the process there are se lines, but as a line is generated the number is decremented. When ls_out is equal to 0 then 0's are generated in those positions.

In the morphological closing operation in accordance with the preferred embodiment, if the pixels under the 1's in the structuring element are 0, then all 0's can stay. Otherwise, they are all changed to 1. Therefore, similar hardware to that described above for the morphological opening operation can be used for the morphological closing operation, except that the pixels need to compare with 0 instead of 1. After the closing operation there is a decoding stage that transforms the output of the morphological closing operation to a normal pixel sequence. The Matlab code for the decoding stage is as follows;

```
for i=1:(size(ipad,1)-padding)
    for j=1:(size(ipad,2)-padding)
        if (1-se<0)
            j_low=1;
        else
            j_low=j-se+1;
        end
        if (sum(ocode(i,j_low:j))>0)
            ipad(i,j)=match;
        else
            ipad(i,j)=1-match;
        end
    end
end
```

The decoding stage looks at the last 'se' entries in the compressed code. If any of the last 're' are 1, then the decoding stage generates 1. Otherwise a 0 is generated. Both the morphological opening and closing operations take 1 clock cycle to generate 1 pixel. However, both operations have pipeline delays of 3 lines for a 4×4 structuring element. Therefore, the whole morphological cleaning operation generates 1 pixel per cycle, with 6 lines of pipeline delay.

The Kernel Selector (KS) 1213 combines the edge strength map and the edge direction maps to form the Kernel Selection Map 1215. Firstly, the KS 1213 finds out where short kernels need to be used in the image by the following boolean equation:

ShortEdge=(EdgeMap &
(HorizEdge|DiagEdge|VertEdge|AntidiagEdge)).

Secondly, the KS 1213 encodes the edge strength and the edge types (smooth, short, horizontal, etc) together to form an index to the Kernel Coefficient Tables 1227. As discussed above, FIG. 7 shows the method for encoding the edge strength and the edge types. The KS 1213 preferably makes a kernel selection per clock cycle and is preferably synchronous to the main system clock.

The Kernel Selection Map (KSM) 1215 contains the type of kernel that is preferably used to interpolate for each input pixel. As discussed above, the KSM 1215 is interpolated to output resolution using nearest-neighbour interpolation. Since each kernel type is encoded with 5 bits, the KSM 1215 has to be 2048×5 bits (ie. 10 kbits). Only the input line that is currently interpolating is needed.

As the Kernel Selector 1213 generates edge types for input pixels, the edge types are fed straight to the Kernel Coefficient Calculator 1229 for kernel coefficient fetching, and the Interpolator 1231 for interpolation. The edge types are also stored in the Kernel Selection Map 1215 so that if the next output line uses the same input line, the edge types need not be recalculated. The Kernel Selection Map 1215 supports one read request or one write request in one clock cycle and is synchronous to the main system clock.

The Kernel Coefficient Tables (KCT) 1227 contain all the coefficients required for interpolation. There are 4 sections to the KCT 1227: smooth kernels, vertical/horizontal across-the-edge kernels (including short kernels), diagonal/anti-diagonal along-the-edge kernels, and diagonal/anti-diagonal across-the-edge kernels. The actual coefficients are the products of two entries from the KCT 1227. These kernel tables can preferably support 256 up-sample points between 2 input pixels, and each coefficient is preferably a 16-bit signed 8.8 fixed point number. The KCT 1227 are described in more detail in the following paragraphs.

Each up-sample point 'x' preferably has 4 entries in the smooth kernel table 1227a, representing the kernel coefficients at x−1, x, x+1 and x+2. The total size of the smooth kernel table 1227a is preferably 4×256×16 bits (ie. 2 kbytes) and preferably provides 4 entries in one clock cycle.

There is one group of short kernel tables 1227b for each edge strength. Hence there are 3 groups of short kernel tables. Each group of short kernel tables 1227b has 4 entries for each up-sample point x, representing the kernel coefficients at x−1, x, x+1, x+2. The total size of the short kernel tables 1227b is preferably 3×4×256×16 bits (ie. 6 kbytes) and preferably provides 4 entries in one clock cycle.

For the diagonal along the edge kernel tables 1227c the number of up-sample points is doubled, since the coefficients are halved. Each group of diagonal along the edge kernel tables 1227c has 8 entries for each up-sample point x, representing the kernel coefficients at x−1.5, x−1, x−0.5, x, x+0.5, x+1, x+1.5, x+2. The total size of the tables is preferably 8×512×16 bits (ie. 8 kbytes) and preferably provide 8 entries in one clock cycle.

There is 1 group of diagonal across-the-edge kernel tables 1227d for each edge strength including 'no edge strength'. The number of up-sample points is doubled, since the coefficients are halved. Each group of diagonal across-the-edge kernel tables 1227d preferably has 8 entries for each up-sample point x, representing the kernel coefficients at k(x−1.5), k(x−1), k(x−0.5), kx, k(x+0.5), k(x+1), k(x+1.5), k(x+2), where k is preferably ½ in accordance with the preferred embodiment. The total size of the tables is preferably 4×8×512×16 bits (ie. 32 kbytes) and preferably provides 8 entries in one clock cycle.

The Kernel Coefficient Calculator (KCC) 1229 is responsible for fetching the appropriate kernel coefficients from KCTs 1227. The KCC 1229 accepts the horizontal and vertical up-sampling rate and down-sampling rate from the Scaling Factor Calculator 1239, as well as the optimum horizontal and vertical offsets in cases of down-sampling. There are two sets of counters (not illustrated) in the KCC 1229 keeping track of the location of the output sample point, one for horizontal coordinate and one for vertical. In each set of counters there is a coordinate counter (not illustrated) counting the x-coordinate of the input sample point which is to the left and above the output sample point, and there is an offset counter (not illustrated) storing the offset from that input sample to the output sample.

Figure 21B:
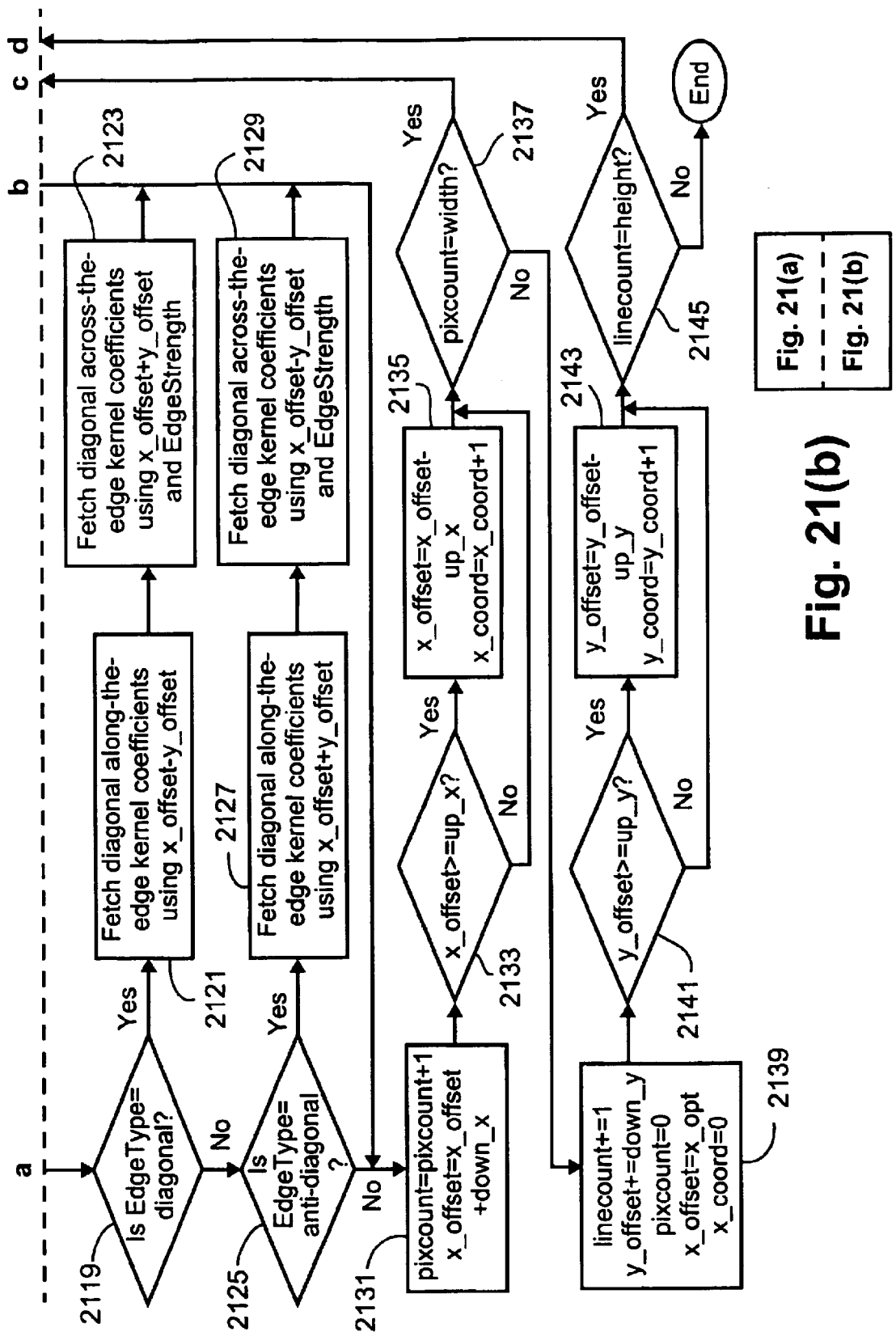
FIG. 21 is a flowchart showing the operation of the Kernel Coefficient Calculator of FIG. 12.

FIG. 21 is a flowchart showing the operation of the KCC 1229 in accordance with the preferred embodiment of the present invention. The process begins at step 2101, where the coordinate counters for the x and y coordinates are set to 0, while the offset counters are set to the optimum offset. The following steps then occur each time an output pixel is generated. At the next step 2103, at the beginning of a line, the KCC 1229 uses the content in the y offset counter to fetch the kernel coefficients of the vertical kernel from smooth kernel tables 1227(a) and short kernel tables 1227(b). At the next step 2105, the kernel coefficients are stored in registers (not illustrated) and are used throughout the line. At the next step 2107, if the kernel selected is smooth, the process continues to step 2113, where the KCC 1229 uses the content in the x offset counter to fetch kernel coefficients in the horizontal kernel from the smooth kernel table 1227(a). The type of kernel table that the KCC 1229 fetches from depends on the kernel used to interpolate the output pixel. At the next step 2109, if the kernel selected is horizontal, the process continues to step 2115, where the KCC 1229 uses the content in the x offset counter and the edge strength to fetch kernel coefficients in the horizontal kernel from the smooth kernel table 1227(a). At the next step 2111, if the kernel selected is vertical, the process continues to step 2117, where the KCC 1229 uses the content in the x offset counter to fetch kernel coefficients in the vertical kernel from the short kernel table 1227(b). At the next step 2119, if the kernel selected is diagonal, the process continues to step 2121, where the KCC 1229 calculates the absolute values of the difference of the x and y offsets, and uses the absolute value to fetch kernel coefficients from the diagonal along-the-edge tables. At the next step 2123, the KCC 1229 calculates the absolute value of the sum of the x and y offsets, and uses the absolute value to fetch kernel coefficients from the diagonal across-the-edge tables, along-the-edge tables. If the kernel selected is anti-diagonal at step 2125, the process continues to step 2127, where the KCC 1229 uses the sum of x and y offsets to fetch coefficient values from the along-the-edge tables. At the next step 2129, the KCC 1229 uses the difference of the x and y offsets to fetch coefficient values from the across-the-edge tables. When fetching is finished, the horizontal down-sampling rate is added to the x offset counter, at step 2131. If the x-offset counter is more than the up-sampling rate, at step 2133, then the process continues to step 2135, where the up-sampling rate is subtracted from it, and the x-coordinate counter is incremented. The process is iterative until a whole line of output pixels is produced. At the next step 2137, when a whole line of output pixels is produced, the process continues to step 2139, where the vertical down-sampling rate is added to the y offset counter. At the next step 2141, if the y offset counter is more than the up-sampling rate, then the process continues to step 2143, where the up-sampling rate is subtracted from it, and the y coordinate counter is incremented. The process concludes at step 2145, when all of the output pixels have been produced.

The KCC 1229 is preferably capable of fetching enough coefficients for interpolation of 1 output pixel in one clock cycle meaning that the KCC 1229 should be able to fetch 4 kernel coefficients for smooth, horizontal, vertical and short kernels, and 14 coefficients for diagonal and anti-diagonal kernels. The KCC 1229 is synchronous to the main clock.

The Interpolator 1231 is responsible for performing convolution on 4×4 input pixels with 4×4 interpolation kernel coefficients to find the output pixels. The Interpolator 1231 accepts the pixels from the ILSM 1207 and the kernel coefficients from the KCC 1229, and produces resultant output pixels to the Colour Space Converter 1233. The Interpolator 1231 includes separate hardware (shown in FIG. 22) for interpolating with both 2D-separable kernels (ie., smooth, short, vertical and horizontal kernels) and 45° and 135° edge kernels (shown in FIG. 23 below). The Interpolator 1231 also includes hardware (shown in FIG. 24 below) for Output Clamping.

Figure 22:
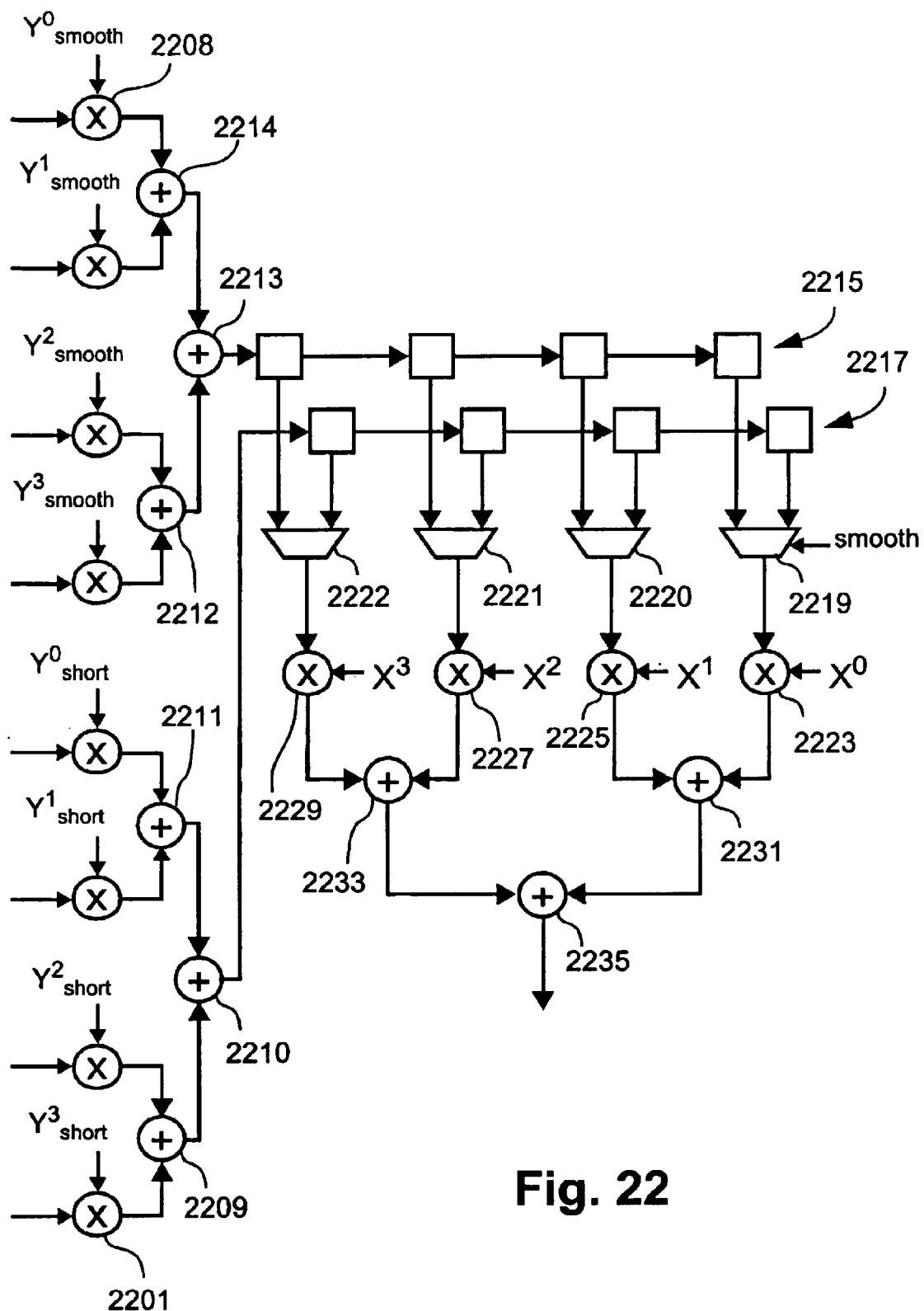
FIG. 22 shows the preferred hardware architecture for interpolating with two dimensional kernels in accordance with the method of FIG. 1.

FIG. 22 shows the Interpolation hardware for 2D-separable kernels in accordance with the preferred embodiment of the present invention. To generate the $n^{th}$ output pixel in a line, the value of p is determined. The value p represents the smallest integer greater than the n*horizontal_step. The interpolator hardware of FIG. 22 fetches the $(p-2)^{th}$, $(p-1)^{th}$, $p^{th}$ and $(p+1)^{th}$ pixels from 4 line stores 1251 to 1255 in the ILSM 1207. The incoming pixels are preferably stored in line stores 1251, 1252, 1253 and 1254 in that order, so that the last 4 most recent lines are in these line stores. The incoming stream of pixels will be stalled if generation of the next line of pixels does not need an extra line of pixels from the input. Two of the line stores can be shared with the line stores used in edge detection. The $(p-2)^{th}$, $(p-1)^{th}$, $p^{th}$ and $(p+1)^{th}$ pixels are multiplied with vertical smooth kernel coefficients $Y^0_{smooth}$, $Y^1_{smooth}$, $Y^2_{smooth}$, and $Y^3_{smooth}$, and vertical short kernel coefficients $Y^0_{short}$, $Y^1_{short}$, $Y^2_{short}$, and $Y^3_{short}$, using the multipliers 2201–2208. $Y^0_{smooth}$, $Y^1_{smooth}$, $Y^2_{smooth}$, $Y^3_{smooth}$, $Y^0_{short}$, $Y^1_{short}$, $Y^2_{short}$, and $Y^3_{short}$ can be fetched at line sync time, so they only need a register. For each kernel, the sum of the 4 products is found using the adders 2209 to 2214 and stored in one of two shift registers 2215 and 2217. The outputs of the shift registers 2215 and 2217 are fed to a set of multiplexers 2219–2222 which are controlled by a signal 'smooth'. The signal 'smooth' is 1 when the current interpolation kernel is a smooth kernel or a vertical kernel. The outputs of the multiplexers 2219–2222 are multiplied with $X^0$, $X^1$, $X^2$, and $X^3$ respectively, using multipliers 2223 to 2229. The products are then added together, using adders 2231 to 2235, to find the interpolated pixel. $X^0$, $X^1$, $x^2$ and $X^3$ vary from one cycle to another, therefore they need to be calculated at every cycle. However, if the horizontal step value can be expressed in terms of p/q, where q is reasonably small, then in total only q sets of $\{X^0, X^1, X^2, X^3\}$ are needed. These sets correspond to s equal to 0, 1/q, 2/q, ... (q–1)/q. The sets of $\{X^0, X^1, X^2, X^3\}$ are values which are fixed for the whole image, so they can be calculated at the start-up time and stored in a LUT.

Depending on the horizontal step size, some or all of the results from vertical interpolation used to generate the next output pixel can be reused, as the horizontal step size is always less than 4. As a result, the Interpolator 1231 shown in FIG. 22 preferably accepts one input pixel per cycle when scaling down an image and the Interpolator preferably outputs one pixel per cycle when scaling up an image. The Interpolator 1231 of FIG. 22 does not work for kernels for 45° and 135° edges, since in these kernels both multipliers have x and y coordinates in them.

Figure 23:
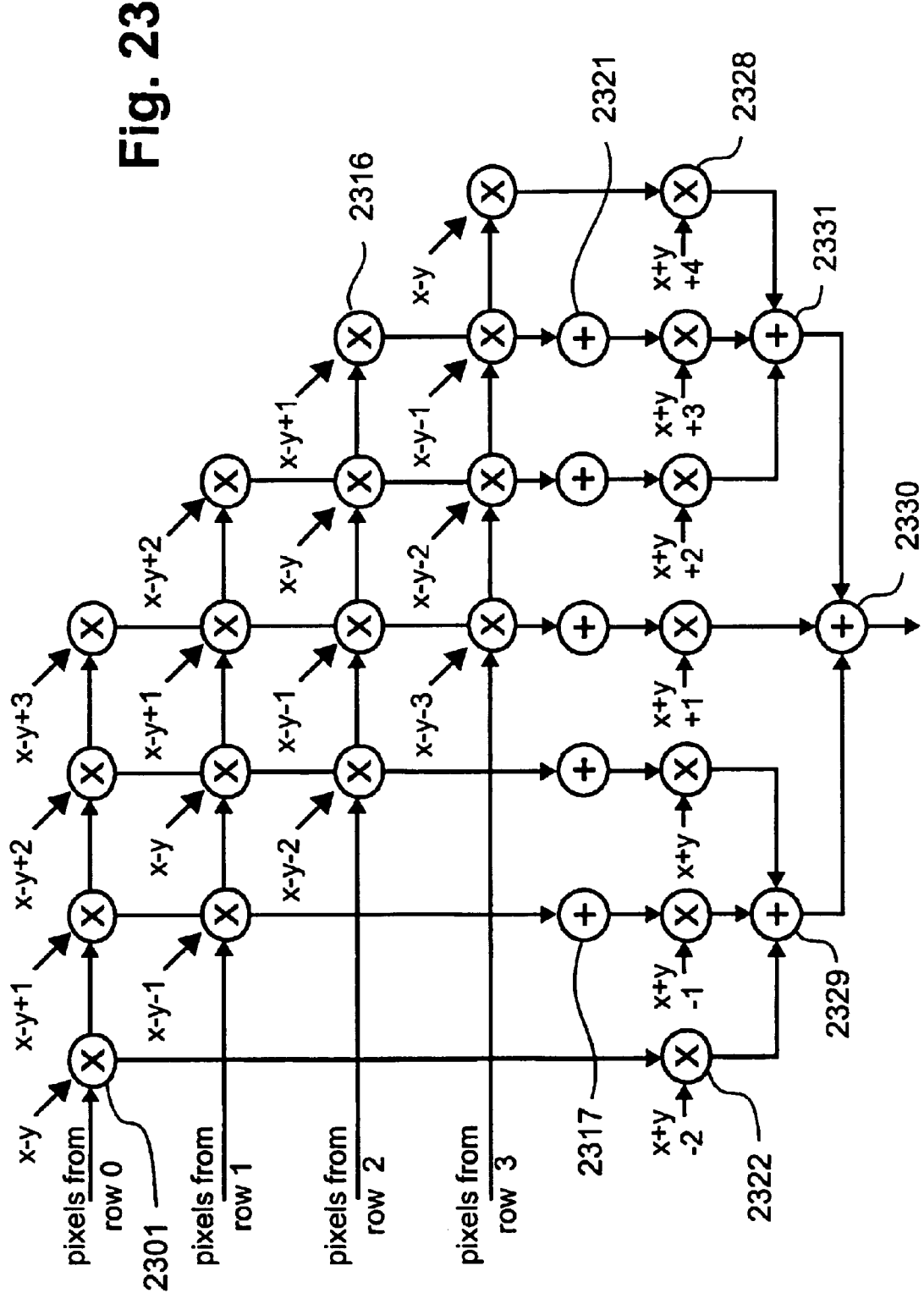
FIG. 23 shows the preferred hardware architecture for interpolating for kernels with 45° and 135° edges in accordance with the method of FIG. 1.
Figure 24:
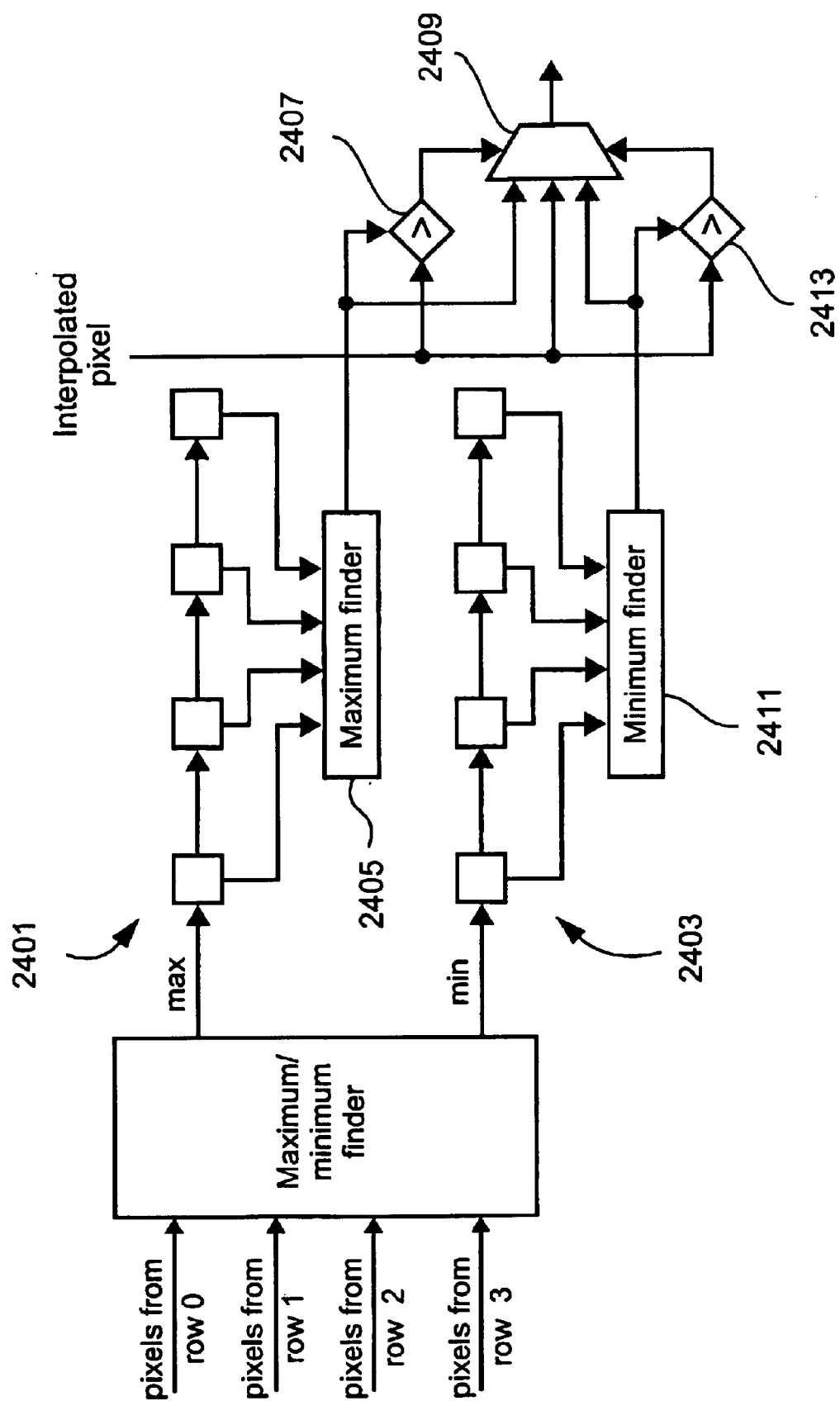
FIG. 24 shows the preferred hardware architecture for output clamping in accordance with the method of FIG. 8.

FIG. 23 shows the interpolation hardware to interpolate for kernels with 45° and 135° edges, in accordance with the preferred embodiment. To generate the $n^{th}$ output pixel in a line, the value of p is determined. The value p represents the smallest integer greater than n*horizontal_step. The interpolator hardware of FIG. 23 fetches the $(p-2)^{th}$, $(p-1)$, $p^{th}$ and $(p+1)^{th}$ pixels from 4 line stores 1251 to 1255 in the ILSM 1207 and multiplies them, using multipliers 2301 to 2316, with the kernel coefficient values generated from the difference of the offsets in the x and y directions. The sum of the products in all of the columns are found using the adders 2321. All of the partial sums are then multiplied, using multipliers 2322 to 2328, with the kernel coefficients generated from the sum of the offsets in the x and y directions. The adders 2329 to 2331 are then used to add the products together to find the interpolated pixel. Extra pipeline registers (not illustrated) may have to be added to increase the frequency at which the interpolator hardware of FIG. 23 can operate. The hardware of FIG. 23 preferably takes 1 cycle to produce an output pixel, as long as one set of kernel coefficients and pixels are supplied in every clock cycle. The hardware of FIG. 23 preferably uses 4 line stores. The switching from 45° to 135° kernels and vice versa can preferably be done immediately. At the same time, the Interpolator 1231 searches for the maximum and minimum of the 4×4 neighbourhood, and clamps the output pixel between them. The Interpolator 1231 can preferably produce one pixel per cycle, and is preferably synchronous to the main system clock FIG. 24 shows the hardware architecture used for output clamping in accordance with the preferred embodiment of the present invention. The output clamping hardware of FIG. 24 fetches the $(p-2)^{th}$, $(p-1)^{th}$, $p^{th}$ and $(p+1)^{th}$ pixels from 4 line stores 1251 to 1255 in the ILSM 1207 and stores the pixels in one of two shift registers 2401 and 2403. The shift register 2401 is used to fund the maximum value of the $(p-2)^{th}$, $(p-1)^{th}$, $p^{th}$ and $(p+1)^{th}$ pixels using a maximum finder 2405. The maximum value from the maximum finder 2405 is compared with the interpolated pixel value using a comparator 2407. The output of the comparator is fed to a multiplexer 2409 and if the calculated interpolated pixel value is greater than the maximum value, then the output value is replaced with the local maximum. Similarly, the minimum value of the $(p-2)^{th}$, $(p-1)^{th}$, $p^{th}$ and $(p+1)^{th}$ pixels from the 4 line stores 1251 to 1255 is found using the shift register 2403 and a minimum finder 2411. The minimum value is compared with the interpolated pixel value using the comparator 2413. The output of the comparator 2413 is fed to the multiplexer 2409 and if the calculated interpolated pixel value is less than the minimum value, then the output value is replaced with the local minimum.

The Colour Space Converter (CSC) 1233 converts YUV pixel data to RGB or vice versa. The equation for converting YUV from RGB is as follows:

$$\begin{pmatrix} Y \\ U \\ V \end{pmatrix} = \begin{pmatrix} 0.299 & 0.587 & 0.114 \\ -0.16875 & -0.33126 & 0.5 \\ 0.5 & -0.41869 & -0.08131 \end{pmatrix} \cdot \begin{pmatrix} R \\ G \\ B \end{pmatrix}$$

And the equation for converting RGB from YUV is as follows:

$$\begin{pmatrix} R \\ G \\ B \end{pmatrix} = \begin{pmatrix} 1 & 0 & 1.402 \\ 1 & -0.3441 & -0.7141 \\ 1 & 1.772 & 0 \end{pmatrix} \cdot \begin{pmatrix} Y \\ U \\ V \end{pmatrix}$$

The equations are implemented in hardware using nine multipliers (not illustrated) and nine adders (not illustrated) which add the products. The output of the matrix multiplication is clamped to 0 and 255. The CSC 1233 generates one pixel per cycle and is synchronous to the main system clock.

The Output Synchroniser 1235 synchronises the data from the main system clock domain to the output pixel clock domain. The main system clock rate should always be greater than or equal to the output pixel rate. The Output Synchroniser 1235 has a ping-pong buffer (not illustrated) which allows the pixels to be written into and read from the buffer at different rates. When one line store in the ping-pong buffer is full, the other line store is swapped to accept the incoming pixels in a next line, while the full line store is read at the output pixel clock rate. The Output Synchroniser 1235 receives an output pixel enable signal from the Output Signal Generator 1237. When the enable signal is asserted the Output Synchroniser 1235 should output a pixel to an external device, such as the display device 1014 of the computer system 1000. The Total storage required by the Output Synchroniser 1235 depends on the maximum width of the output display. If the maximum width is from HDTV, then total storage required is 2×2048×8 bits, ie. 4 kbytes.

The Serial ROM Interface (SRI) 1201 preferably follows the SPI™ protocol and has dual functions. When self configuration is selected the SRI 1201 assumes that a serial ROM is connected to it and will read all information required for the RC Chip 1103 operation. Otherwise, the SRI 1201 can be used as a means to communicate with another device, where the RC Chip 1103 acts as a target.

A '1394 Interface' 1263 is preferably used in the RC chip 1103. The '1394 Interface' 1263 is the IEEE designation for a new high-performance serial bus designed to fill the need for high-speed digital communications between electronic devices. The IEEE standard defines both a physical layer and a cable connected virtual bus. The interface standard defines a transmission method, media and protocol. The main advantage of the '1394 Interface' 1263 is firstly a large bandwidth capacity. The maximum 400 Mbits bandwidth allows the '1394 Interface' 1263 to be used for streaming digital images. Using the '1394 Interface' 1263 the RC Chip 1103 can be connected to any digital still camera (and other multimedia devices) and can perform resolution conversion on images generated by the digital still camera. Secondly, "hot plugging," power sourcing, and dynamic reconfiguration abilities make the IEEE 1394 Interface a user-friendly interface. The features of the IEEE 1394 Interface will make plugging into a computer expansion system as easy as plugging into AC power, providing communications on demand without having to shut down and reconfigure the RC Chip 1103 each time an I/O device is added or removed. The RC Chip 1103 can be used as the image source rather than a Video Interface Controller.

The PCI Interface 1200 allows the host CPU, for example the processor 1005 to read and write various tables, line stores and registers in the RC chip 1103. The PCI Interface 1200 allows the host CPU to configure the RC Chip 1103 and perform diagnosis on the system when an error or interrupt occurs. The PCI Interface 1200 also allows the RC Chip 1103 to interrupt the host CPU under user specified circumstances. The PCI interface 1200 can be replaced by any microprocessor interface (eg., PowerPC™ interface) depending on the microprocessor that is used to configure the RC Chip 1103.

The foregoing describes only some embodiments of the present invention, and modifications and/or changes can be made thereto without departing from the scope and spirit of the invention, the embodiment(s) being illustrative and not restrictive.

What is claimed is:

1. A method of interpolating image data comprising a first mapping of discrete sample values, said method comprising the steps of:
   (i) calculating edge information for each of the discrete sample values of the image data to identify edge sample values and storing an angle of orientation and an edge strength value for each of the edge sample values;
   (ii) manipulating the edge sample values and the stored angle of orientation for each of the discrete sample values using a morphological process;
   (iii) combining the manipulated edge sample values and the manipulated angle of orientation for each of the discrete sample values to form a second mapping of the discrete sample values;
   (iv) mapping said second mapping, using a mapping function, to form a third mapping;
   (v) for each discrete sample value of said third mapping:
      (i) calculating parameters of a kernel, wherein the parameters are dependant upon the edge sample values and the angle of orientation of each of the sample values of said third mapping;
      (ii) calculating a plurality of kernel values utilizing the parameters and the kernel; and
   (vi) convolving the plurality of kernel values with said first mapping of discrete sample values to form a fourth mapping of discrete sample values.

2. The method according to claim 1, wherein said steps (i) to (vi) are carried out on at least one of a plurality of portions of said first mapping of discrete sample values of the image data.

3. The method according to claim 1, wherein said fourth mapping is at a different resolution to said first mapping.

4. The method according to claim 1, wherein the image data is color image data.

5. The method according to claim 4, wherein said steps (i) to (vi) are carried out for each color plane of the color image data.

6. The method according to claim 4, wherein step (i) is carried out in a first color plane and step (v) is carried out in a plurality of color planes.

7. The method according to claim 1, wherein step (i) includes the further sub-steps of:
   calculating an edge indicator value C as the edge information; and
   comparing the edge indicator value with a plurality of threshold values, wherein the edge strength value is based on the comparisons.

8. The method according to claim 7, wherein the edge indicator C is of the form:

$$C = \max(|Y_0 - Y_i|), i \in 1, \ldots, 8$$

and wherein i is an index of the 8 nearest neighbor discrete sample values of a center discrete sample value $Y_0$.

9. The method according to claim 1, comprising the further step of determining the angle of orientation for each of the edge sample values.

10. The method according to claim 1, wherein said morphological process is a cleaning operation.

11. The method according to claim 10, wherein said cleaning operation is a morphological opening operation followed by a morphological closing operation.

12. The method according to claim 1, wherein said mapping function is a nearest neighbor mapping function.

13. The method according to claim 1, wherein the kernel is a universal interpolation kernel h(s).

14. The method according to claim 13, wherein the universal interpolation kernel is of the form:

$$h(s_x, s_y)_{0 \le \theta \le \pi/2} = \frac{1}{\sqrt{2}} \{ (h(1 - 2\theta/\pi)s_x + (2\theta/\pi)s_y)_{c=0.5} \cdot h(((2\theta/\pi)s_x + (2\theta/\pi - 1)s_y)w(\theta))_{c=0} \}$$

$$h(s_x, s_y)_{\pi/2 < \theta < \pi} = \frac{1}{\sqrt{2}} \{ (h(2\theta/\pi - 1)s_x + (2\theta/\pi - 2)s_y)_{c=0.5} \cdot h(((2\theta/\pi - 2)s_x + (1 - 2\theta/\pi)s_y)w(\theta))_{c=0} \}$$

wherein h(s) is defined as:

$$h(s) = \begin{cases} 1, & 0 \le |s| \le d \\ \left(2 - \frac{3}{2}b - c\right)\left|\frac{s-d}{1-2d}\right|^3 + (-3 + 2b + c)\left|\frac{s-d}{1-2d}\right|^2 + \left(1 - \frac{1}{3}b\right), & d < |s| \le 1-d \\ 0, & 1-d < |s| \le 1+d \\ \left(-\frac{1}{6}b - c\right)\left|\frac{s-3d}{1-2d}\right|^3 + (b + 5c)\left|\frac{s-3d}{1-2d}\right|^2 + (-2b - 8c)\left|\frac{s-3d}{1-2d}\right| + \left(\frac{4}{3}b + 4c\right), & 1+d < |s| \le 2-d \\ 0, & \text{Otherwise} \end{cases}$$

and wherein s=t/Δt and 0≦d<0.5.

15. The method according to claim 1, wherein the kernel is a cubic interpolation kernel h(s).

16. The method according to claim 15, wherein the cubic interpolation kernel, h(s), is of the form:

$$h(s) = \begin{cases} \left(2 - \frac{3}{2}b - c\right)|s|^3 + (-3 + 2b + c)|s|^2 + \left(1 - \frac{1}{3}b\right), & |s| \le 1 \\ \left(-\frac{1}{6}b - c\right)|s|^3 + (b + 5c)|s|^2 + (-2b - 8c)|s| + \left(\frac{4}{3}b + 4c\right), & 1 < |s| \le 2 \\ 0, & \text{Otherwise} \end{cases}$$

and wherein b=0 and c=0.5.

17. The method according to claim 1, wherein the kernel is a linear interpolation kernel.

18. The method according to claim 1, wherein the kernel is a universal linear interpolation kernel.

19. The method according to claim 1, wherein the kernel is a quadratic interpolation kernel.

20. The method according to claim 1, wherein the kernel is a weighted sinc interpolation kernel.

21. An apparatus for interpolating image data comprising a first mapping of discrete sample values, said apparatus comprising:

first calculation means for calculating edge information for each of the discrete sample values of the image data to identify edge sample values and storing an angle of orientation and an edge strength value for each of the edge sample values;

manipulation means for manipulating the edge sample values and the stored angle of orientation for each of the discrete sample values using a morphological process;

combination means for combining the manipulated edge sample values and the manipulated angle of orientation for each of the discrete sample values to form a second mapping of the discrete sample values;

mapping means for mapping said second mapping, using a mapping function, to form a third mapping;

second calculation means for calculating parameters of a kernel for each discrete sample value of said third mapping, wherein said parameters are dependant upon the edge sample values and the angle of orientation of each of the sample values of said third mapping, and for calculating a plurality of kernel values utilizing the parameters and the kernel; and convolution means for convolving the plurality of kernel values with said first mapping of discrete sample values to form a fourth mapping of discrete sample values.

22. The apparatus according to claim 21, wherein said fourth mapping is at a different resolution to said first mapping.

23. The apparatus according to claim 21, wherein the image data is color image data.

24. A computer readable medium, having a program recorded thereon, where said program is configured to make a computer execute a procedure to interpolate image data comprising a first mapping of discrete sample values, said program comprising:

code for calculating edge information for each of the discrete sample values of the image data to identify edge sample values and storing an angle of orientation and an edge strength value for each of the edge sample values;

code for manipulating the edge sample values and the stored angle of orientation for each of the discrete sample values using a morphological process;

code for combining the manipulated edge sample values and the manipulated angle of orientation for each of the discrete sample values to form a second mapping of the discrete sample values;

code for mapping said second mapping, using a mapping function, to form a third mapping, wherein for each discrete sample value of said third mapping, said program comprises code for calculating parameters of a kernel, wherein the parameters are dependant upon the edge sample values and the angle of orientation of each of the sample values of said third mapping, and for calculating a plurality of kernel values utilizing the parameters and the kernel; and code for convolving the plurality of kernel values with said first mapping of discrete sample values to form a fourth mapping of discrete sample values.

25. The computer readable medium according to claim 24, wherein said fourth mapping is at a different resolution to said first mapping.

26. The computer readable medium according to claim 24, wherein the image data is color image data.

27. The computer readable medium according to claim 24, further comprising:

code for calculating an edge indicator value C as the edge information; and $$h(s) = \begin{cases} 1, & 0 \leq |s| \leq d \\ \left(2 - \frac{3}{2}b - c\right)\left|\frac{s-d}{1-2d}\right|^3 + (-3 + 2b + c)\left|\frac{s-d}{1-2d}\right|^2 + \left(1 - \frac{1}{3}b\right), & d < |s| \leq 1-d \\ 0, & 1-d < |s| \leq 1+d \\ \left(-\frac{1}{6}b - c\right)\left|\frac{s-3d}{1-2d}\right|^3 + (b+5c)\left|\frac{s-3d}{1-2d}\right|^2 + (-2b-8c)\left|\frac{s-3d}{1-2d}\right| + \left(\frac{4}{3}b + 4c\right), & 1+d < |s| \leq 2-d \\ 0, & \text{Otherwise} \end{cases}$$

code for comparing the edge indicator value with a plurality of threshold values, wherein said edge strength value is based on the comparisons.

28. The computer readable medium according to claim 27, wherein the edge indicator C is of the form:

$$C = \max(|Y_0 - Y_i|), i \in 1, \ldots, 8$$

and wherein i is an index of the 8 nearest neighbor discrete sample values of a center discrete sample value $Y_0$.

29. The computer readable medium according to claim 24, further comprising code for determining the angle of orientation for each of the edge sample values.

30. The computer readable medium according to claim 24, wherein said morphological process is a cleaning operation.

31. The computer readable medium according to claim 30, wherein said cleaning operation is a morphological opening operation followed by a morphological closing operation.

32. The computer readable medium according to claim 24, wherein said mapping function is a nearest neighbor mapping function.

33. The computer readable medium according to claim 24, wherein the kernel is a universal interpolation kernel h(s).

34. The computer readable medium according to claim 33, wherein the universal interpolation kernel is of the form:

$$h(s_x, s_y)_{0 \leq \theta \leq \pi/2} = \frac{1}{\sqrt{2}}\{(h(1 - 2\theta/\pi)s_x + (2\theta/\pi)s_y)_{c=0.5} \cdot$$
$$h(((2\theta/\pi)s_x(2\theta/\pi)s_y + (2\theta/\pi - 1)s_y)w(\theta))_{c=0}\}$$
$$h(s_x, s_y)_{\pi/2 < \theta < \pi} = \frac{1}{\sqrt{2}}\{(h(2\theta/\pi - 1)s_x + (2\theta/\pi - 2)s_y)_{c=0.5} \cdot$$
$$h(((2\theta/\pi - 2)s_x + (1 - 2\theta/\pi)s_y)w(\theta))_{c=0}\}$$

wherein h(s) is defined as:

and wherein s=t/Δt and 0≦d<0.5.

35. The computer readable medium according to claim 24, wherein the kernel is a cubic interpolation kernel h(s).

36. The computer readable medium according to claim 35, wherein the cubic interpolation kernel h(s) is of the form:

$$h(s) = \begin{cases} \left(2 - \frac{3}{2}b - c\right)|s|^3 + \left(-3 + 2b + c\right)|s|^2 + \left(1 - \frac{1}{3}b\right), & |s| \leq 1 \\ \left(-\frac{1}{6}b - c\right)|s|^3 + (b + 5c)|s|^2 + (-2b - 8c)|s| + \left(\frac{4}{3}b + 4c\right), & 1 < |s| \leq 2 \\ 0, & \text{Otherwise} \end{cases}$$

and wherein b=0 and c=0.5.

37. The computer readable medium according to claim 24, wherein the kernel is a linear interpolation kernel.

38. The computer readable medium according to claim 24, wherein the kernel is a universal linear interpolation kernel.

39. The computer readable medium according to claim 24, wherein the kernel is a quadratic interpolation kernel.

40. The computer readable medium according to claim 24, wherein the kernel is a weighted sinc interpolation kernel.

* * * * *

UNITED STATES PATENT AND TRADEMARK OFFICE
CERTIFICATE OF CORRECTION

PATENT NO. : 6,928,196 B1
DATED : August 9, 2005
INVENTOR(S) : Andrew Peter Bradley et al.

It is certified that error appears in the above-identified patent and that said Letters Patent is hereby corrected as shown below:

Column 10,
Table 2,

| Directional Channel | Edge Angle Quantisation |
|---|---|
| HorizEdge (0) | $((G_\theta >= -\pi/20) \& (G_\theta <= \pi/20)) \| ((G_\theta > 1919\pi/20) \| (G_\theta < -1919\pi/20))$ |
| DiagEdge ($\pi/4$) | $((G_\theta > \pi/20) \& (G_\theta <= 99\pi/20)) \| ((G_\theta < -1111\pi/20) \& (G_\theta >= -1919\pi/20))$ |
| VertEdge ($\pi/2$) | $((G_\theta > 99\pi/20) \& (G_\theta <= 1111\pi/20)) \| ((G_\theta < -99\pi/20) \& (G_\theta >= -1111\pi/20))$ |
| AntidiagEdge ($3\pi/4$) | $((G_\theta > 1111\pi/20) \& (G_\theta <= 1919\pi/20)) \| ((G_\theta < -\pi/20) \& (G_\theta >= -99\pi/20))$ | should read

| Directional Channel | Edge Angle Quantisation |
|---|---|
| HorizEdge (0) | $((G_\theta >= -\pi/20) \& (G_\theta <= \pi/20)) \| ((G_\theta > 19\pi/20) \| (G_\theta < -19\pi/20))$ |
| DiagEdge ($\pi/4$) | $((G_\theta > \pi/20) \& (G_\theta <= 9\pi/20)) \| ((G_\theta < -11\pi/20) \& (G_\theta >= -19\pi/20))$ |
| VertEdge ($\pi/2$) | $((G_\theta > 9\pi/20) \& (G_\theta <= 11\pi/20)) \| ((G_\theta < -9\pi/20) \& (G_\theta >= -11\pi/20))$ |
| AntidiagEdge ($3\pi/4$) | $((G_\theta > 11\pi/20) \& (G_\theta <= 19\pi/20)) \| ((G_\theta < -\pi/20) \& (G_\theta >= -9\pi/20))$ |

Column 18,
Line 43, "Analogue" should read -- Analog --.

Column 23,
Line 59, "contains" should read -- contain --.

Column 26,
Line 18, "elseif" should read -- else if --.

UNITED STATES PATENT AND TRADEMARK OFFICE
CERTIFICATE OF CORRECTION

PATENT NO. : 6,928,196 B1
DATED : August 9, 2005
INVENTOR(S) : Andrew Peter Brandley et al.

It is certified that error appears in the above-identified patent and that said Letters Patent is hereby corrected as shown below:

Column 36,
Line 16, "$(2\theta/\pi)s_y$" should be deleted; and

Line 18, "$\dfrac{1}{\sqrt{2}}\{(h(2\theta/\pi$" should read -- $\dfrac{1}{\sqrt{2}}\{h((2\theta/\pi$ --.

Signed and Sealed this

Twenty-first Day of February, 2006

JON W. DUDAS
*Director of the United States Patent and Trademark Office*